(12) United States Patent
Leitermann et al.

(10) Patent No.: US 11,568,358 B2
(45) Date of Patent: Jan. 31, 2023

(54) FILTERING CROSS READS AMONG RADIO FREQUENCY IDENTIFICATION (RFID) ENABLED READERS AND SYSTEMS AND METHODS FOR USE THEREOF

(71) Applicant: Wavemark, Inc., Concord, MA (US)

(72) Inventors: Richard Eugene Leitermann, Arlington, MA (US); Brent Everett Koeppel, Natick, MA (US)

(73) Assignee: WAVEMARK, INC., Concord, MA (US)

( * ) Notice: Subject to any disclaimer, the term of this patent is extended or adjusted under 35 U.S.C. 154(b) by 0 days.

(21) Appl. No.: 17/097,968

(22) Filed: Nov. 13, 2020

(65) Prior Publication Data

US 2021/0150462 A1  May 20, 2021

Related U.S. Application Data

(60) Provisional application No. 62/936,114, filed on Nov. 15, 2019.

(51) Int. Cl.
| | |
|---|---|
| *G06Q 10/08* | (2012.01) |
| *G06K 7/10* | (2006.01) |
| *G06K 19/07* | (2006.01) |
| *G06Q 30/00* | (2012.01) |

(52) U.S. Cl.
CPC ....... *G06Q 10/087* (2013.01); *G06K 7/10297* (2013.01); *G06K 7/10356* (2013.01); *G06K 7/10415* (2013.01); *G06K 19/0723* (2013.01); *G06Q 30/0185* (2013.01); *G06K 2007/10504* (2013.01); *G06K 2007/10524* (2013.01)

(58) Field of Classification Search
CPC .................. G06Q 10/087; G06K 7/10297
See application file for complete search history.

(56) References Cited

U.S. PATENT DOCUMENTS

| | | | |
|---|---|---|---|
| 9,477,938 B1 * | 10/2016 | Russell ............ | G06K 19/07758 |
| 9,740,897 B1 * | 8/2017 | Salour ................ | G06K 7/10366 |
| 10,332,069 B2 * | 6/2019 | Stiefel .................. | G06Q 20/203 |
| 10,565,410 B1 * | 2/2020 | Shmulevich ..... | G06K 19/07777 |
| 2010/0201488 A1 * | 8/2010 | Stern .................... | G06K 7/0008 340/10.1 |
| 2016/0103198 A1 | 4/2016 | Swope et al. | |
| 2017/0063476 A1 * | 3/2017 | Nair ................... | G06K 7/10475 |
| 2017/0364720 A1 | 12/2017 | Kantor et al. | |
| 2018/0270631 A1 * | 9/2018 | High ................... | G01G 19/387 |

FOREIGN PATENT DOCUMENTS

WO    WO 2018/183571 A1    10/2018

* cited by examiner

*Primary Examiner* — A. Hunter Wilder
(74) *Attorney, Agent, or Firm* — ArentFox Schiff LLP

(57) ABSTRACT

Radio frequency identification (RFID) enabled readers and systems and methods for filtering cross reads of RFID tags and use thereof. The systems and methods may be configured to operate with mobile and/or fixed RFID readers. The systems and methods may provide for claim based filtering of cross reads based upon adjusting operating powers of RFID readers and/or antenna. The systems and methods may also be configured to apply weights to claims thereby providing efficient and/or accurate filtering of cross reads. The systems and methods may also provide for a database that may also be presented to a user to illustrate locations of inventory at any point in time or over a period of time, or to facilitate the ability of a user to physically locate inventory to be acted upon.

10 Claims, 16 Drawing Sheets

Figure 15 A

FILTERING CROSS READS AMONG RADIO FREQUENCY IDENTIFICATION (RFID) ENABLED READERS AND SYSTEMS AND METHODS FOR USE THEREOF

CROSS REFERENCE TO RELATED APPLICATIONS

This application claims priority to U.S. Provisional Patent Application No. 62/936,114, filed Nov. 15, 2019, the entire contents of which is hereby incorporated in their entirety

TECHNICAL FIELD

Aspects of the present disclosure are directed to filtering cross reads of radio frequency identification (RFID) enabled readers and systems and methods for use thereof.

BACKGROUND AND SUMMARY

This background and summary are provided to introduce a selection of concepts in a simplified form that are further described below in the DETAILED DESCRIPTION. This background and summary are not intended to identify key features of the claimed subject matter, nor is it intended to be used as an aid in determining the scope of the claimed subject matter.

Radio frequency identification (RFID) tags allow for real-time tracking of items to provide a wide variety information, for example, inventory, expiration dates, locations, usage, etc. Using information obtained by RFID enabled readers from RFID tags, suppliers, customers and users may be able to see what they have at any given location and any given time without manually tracking product inventory. RFID enabled readers may be a handheld device containing a single reader, or may comprise a plurality of RFID enabled readers embedded into a single device. The proximity of a plurality of RFID enabled readers or overlapping zones read within a common space may cause erroneous cross reads, and thereby fail to provide an accurate reading of individual RFID tags or a plurality of RFID tags. For example, a product comprising a single RFID tag may be scanned twice by two different RFID enabled readers in close proximity, thereby causing an inaccurate inventory count. In another example, a product may be scanned by two different RFID enabled readers in close proximity thereby causing an inaccurate determined location of the product.

Aspects of the present disclosure relate to filtering these erroneous cross reads from RFID enabled devices and systems and methods for use thereof. In one aspect of the disclosure, a RFID enabled system may include adjusting the power levels for which each reader operates. In another aspect of the disclosure, a power level adjustment may provide for a more precise unit count and location determination. In another aspect of the disclosure, RFID enabled readers may place different weighted RFID readings (such weighted readings also being interchangeably referred to herein as "claims") on a read RFID tag to determine a location of the RFID tag and/or the numerical amount of the products comprising the RFID tags.

The systems and methods may include one or more devices, such as one or more computers or other terminal devices and/or computer systems, for managing cross reads among RFID enabled readers, among other functions. The system may include features for operating on ultrahigh frequency (UHF), high frequency (HF) RFID and/or low frequency (LF) with a plurality of products affixed with RFID tags, for example, and determining the location and/or quantity of the products affixed with the RFID tag.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of implementations of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further features and advances thereof, will be best understood by reference to the following detailed description of illustrative implementations of the disclosure when read in conjunction with the accompanying drawings, wherein:

FIG. 15A and FIG. 15B illustrate results of an example application test of the device and method in accordance with aspects of the present disclosure.

DETAILED DESCRIPTION

Figure 1:
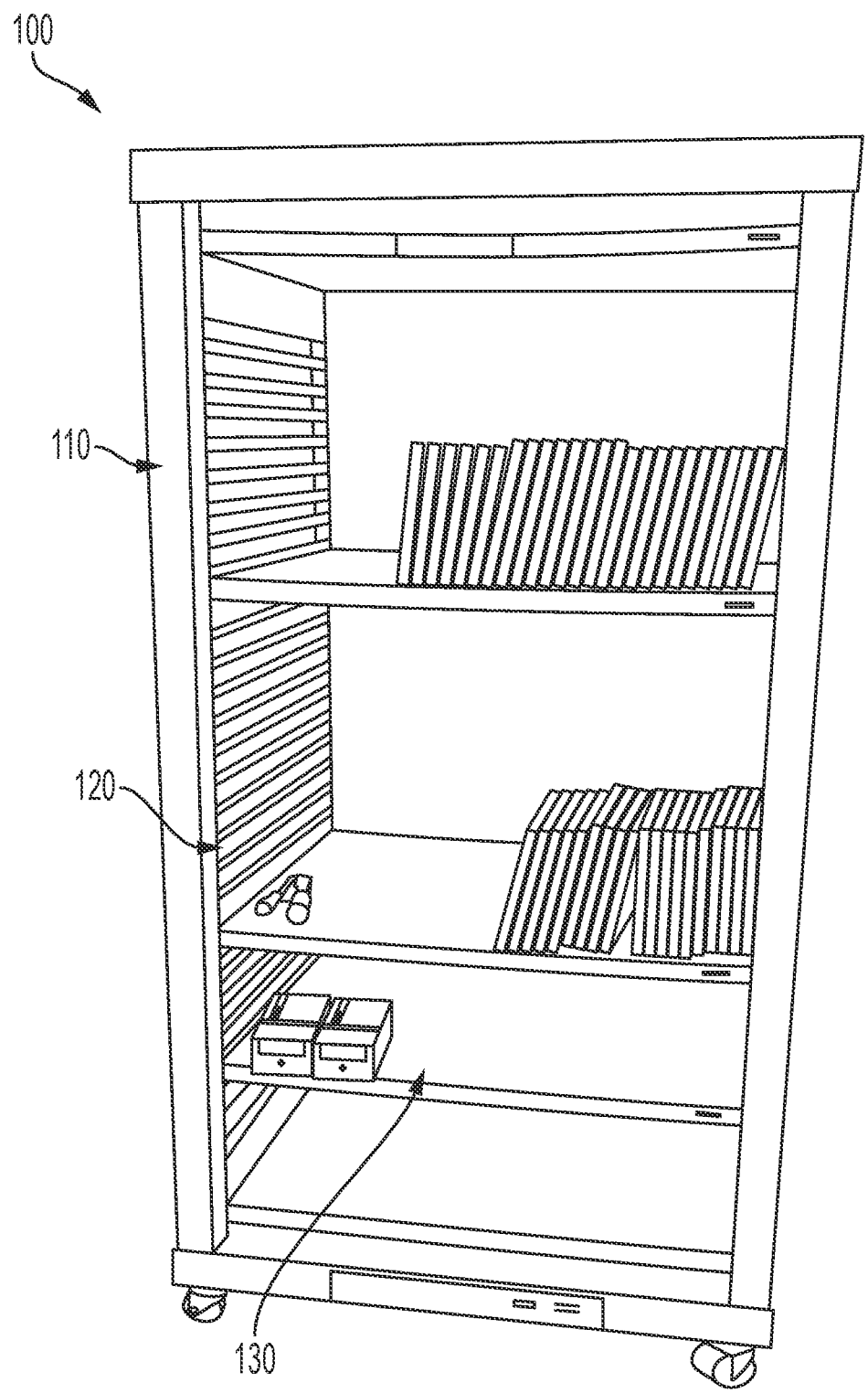
FIG. 1 illustrates an example storage cabinet in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

A "cross read," as used herein may include situations in which a single or plurality of RFID tags is read by more than one discrete RFID readers and/or systems. A cross read of a RFID tag may cause, for example, inaccurate inventory counts, inaccurate location identification, etc.

The terms "loop(s)," "antenna loop(s)," and "RFID reader(s)" may be used herein interchangeably and may include any form or configuration of a RFID antenna/antennae. Further, although the disclosure below may be described with terms that are specific to HF or UHF, the disclosure may be applied in principle to either HF or UHF, or may be applied to a system that includes both HF and UHF.

The terms "loop(s)," "antenna loop(s)," and "RFID reader(s)" as used herein may include when the device is mounted, affixed, stationary or moveable. For example, in one aspect of the disclosure, the RFID reader(s) may be included/mounted/located within a cabinet or container. In another aspect of the disclosure, for example, the RFID reader(s) may be handheld or worn. In another aspect of the disclosure, for example, the RFID reader(s) may be mounted in a room, warehouse, storage facility, hallway, area, etc. In another aspect of the disclosure, the RFID reader(s) may be mounted to or contained in any surface, for example, a shelf, wall, ceiling, ceiling tile, supports, roof, floor, lighting fixtures, etc.

A "claim," as used herein may include situations in which a specific RFID reader and/or system asserts title and/or ownership and/or affirmation with regard to a RFID tag affixed to a product. A claim to a RFID tag may also have different weights, as described further below. When a claim is made by more than one RFID reader or system on a specific RFID tag based on cross reads, the system, as described below, may determine which RFID reader is properly entitled to the claim. A claim may help determine the location of the product affixed with the RFID tag, and may also increase the accuracy of an inventory count, as also further described below.

As generally described herein, aspects of the present disclosure may provide for systems and methods for filtering cross reads of RFID tags among RFID enabled storage cabinets and/or portable RFID enabled readers, hereinafter also interchangeably referred to as RFID Readers. For instance, an example system in accordance with aspects of the present disclosure may provide for determining a specific location or accurate quantity count of products affixed with a RFID tag or tags that may be read by a plurality of RFID enabled readers and/or RFID enabled storage cabinets. For example, a product may be affixed with a RFID tag that is located in a position allowing for more than one RFID enabled reader and/or RFID enabled storage cabinet to read the RFID tag, thereby causing a cross read. The systems and methods described below, allow for filtering of cross reads by comparing the weighting of claims to a RFID tag by RFID Readers. Further, the system and method may filter cross reads of products affixed with a RFID tag operating at any, both, or all of LF, HF, or UHF.

Referring now to FIG. 1, illustrated is an example storage cabinet in accordance with aspects of the present disclosure. For example, the storage cabinet 100 may include various RFID enabled features contained within the storage cabinet 100. For example, as described below, the storage cabinet 100 may include or interoperate with a plurality of RFID enabled zones. In one aspect of the disclosure, the plurality of RFID enable zones may comprise a plurality of antennas embedded or attached to the shelves, walls, top, bottom, etc. of the storage cabinet 100, for example, including a plurality of antenna loops. As discussed below, these antennas may be overlapping with one another, thereby creating a plurality of antenna loops configured to read RFID tags.

In one aspect of the disclosure, the storage cabinet 100 may be mobile, such that it may be relocated, rather than being permanently affixed to a single location after installation. Further, the storage cabinet 100 may be placed within close proximity to a second storage cabinet 100. For example, the storage cabinet 100 may abut, sit next to, be placed back-to-back, or be located in close proximity to a second storage cabinet, for example, in the same room. In one aspect of the disclosure, the storage cabinet 100 may include a housing 110 having a plurality of slots or other shelf retaining features 120 that are configured to support and/or provide communications with a respective shelf 130 supported by or in proximity thereof. In this manner, the number of shelves and spacing between each pair of successive shelves implemented in the storage cabinet 100 may be customizable, for example, based on user needs and/or a product size stored thereon. For example, the shelf 130 may have additional shelves placed immediately above and/or below the area containing slots 120.

In one aspect of the disclosure, the storage cabinet 100 may have wireless and/or wired connectivity to a remote server, additional storage cabinets 100, and/or other RFID Readers, as described below. The wired or wireless connectivity, may include, but not be limited to one or more universal serial bus (USB) connections, wireless fidelity ("Wi-Fi") coupling, Bluetooth or Bluetooth Low Energy (BLE) coupling, Ethernet connection, cable connection, digital subscriber line (DSL) connection, cellular coupling (e.g., 3G, LTE/4G or 5G), or other suitable coupling or couplings.

Figure 2:
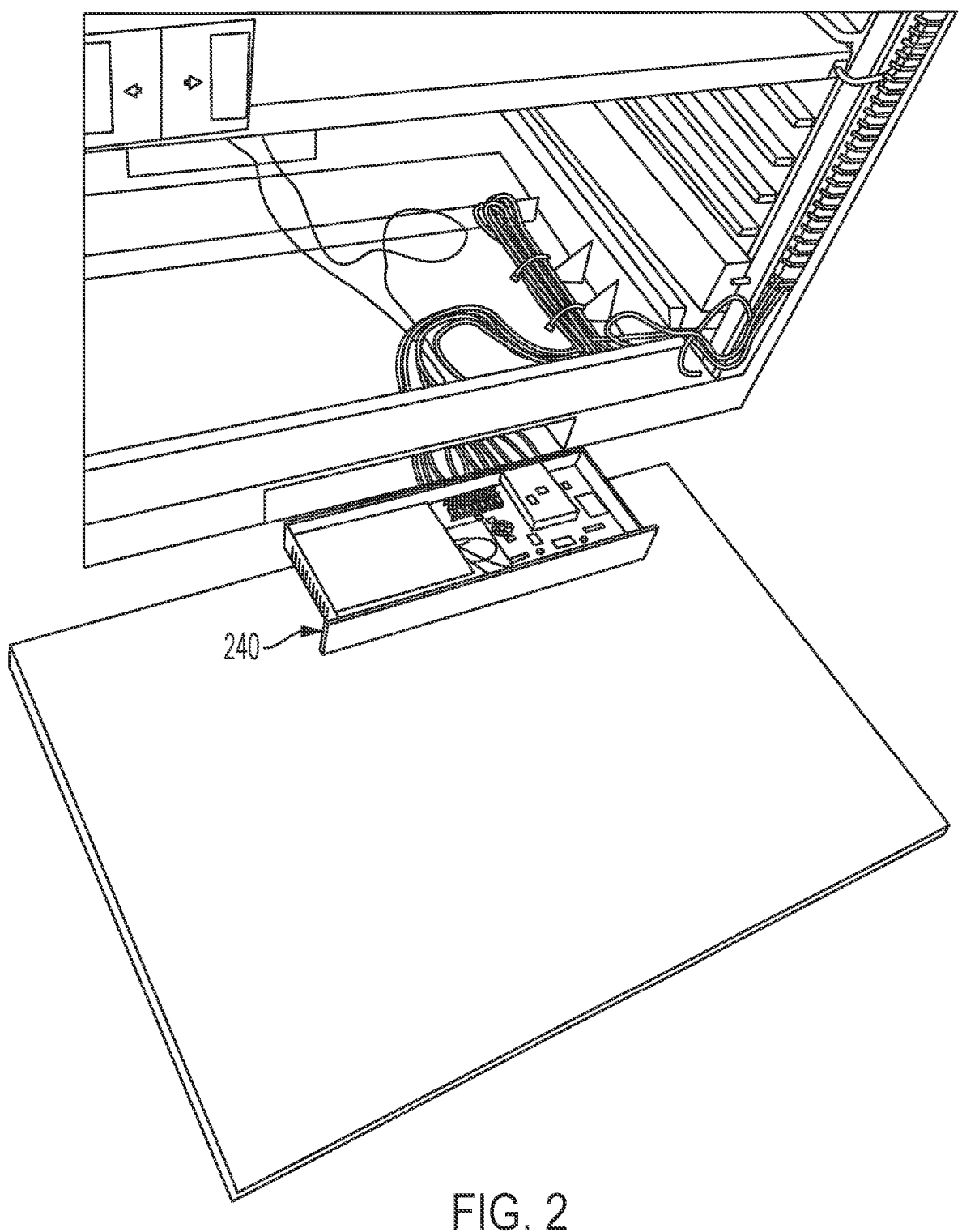
FIG. 2 illustrates an example control unit in accordance with aspects of the present disclosure.

Referring now to FIG. 2, in aspect of the disclosure, the storage cabinet 100 of FIG. 1, may include a control unit 240 that may be communicatively coupled, via wired or wireless connectivity, for example, to or via one or more of the shelves 130 that may be housed within the plurality of slots 120. The control unit 240 may include an internal power supply and/or may be coupled to an external power supply (not shown). As further illustrated in FIG. 3, the control unit 240 may also include an RFID communication circuit 242 for communicating signals (e.g., emission signal) via the shelves 130 of FIG. 1. As described above, each of the shelves 130 may comprise a separate RFID antenna and/or a plurality of RFID antennas. As described in greater detail below, the control unit 240 may trigger, via a emission signal, for example, each of the RFID antennas within the storage cabinet 100 to read RFID tags affixed to products that may be contained with the storage cabinet 100.

In another aspect of the disclosure, the control unit 240 may also include an attenuator for selectively reducing the power of the signal communicated via the shelves 130 of FIG. 1. For example, the power of the signal communicated via the shelves may be about 1 to 5 Watts (1 Watt, 2 Watts, 3 Watts, up to 5 Watts), and the attenuator may reduce the power by about 75%. In one aspect of the disclosure, the attenuator may reduce the power of the signal triggering the read by a factor of 4 (6 dB), for example, at a 1 Watt reader setting, the storage cabinet 100 may read RFID tags at a ¼ Watt with the attenuator activated. By variably reducing the power (e.g., selectively varying the power of readings), the control unit 240 may be more accurately used to determine the location within the storage cabinet 100 of a given product affixed with a RFID tag. For example, the reduced power may result in RFID tags being identified only by one or more antenna loops, or only by certain antenna loops, with RFID identification varying with a plurality readings so as to more accurately identify tags in closest proximity to each RFID antenna.

Figure 4:
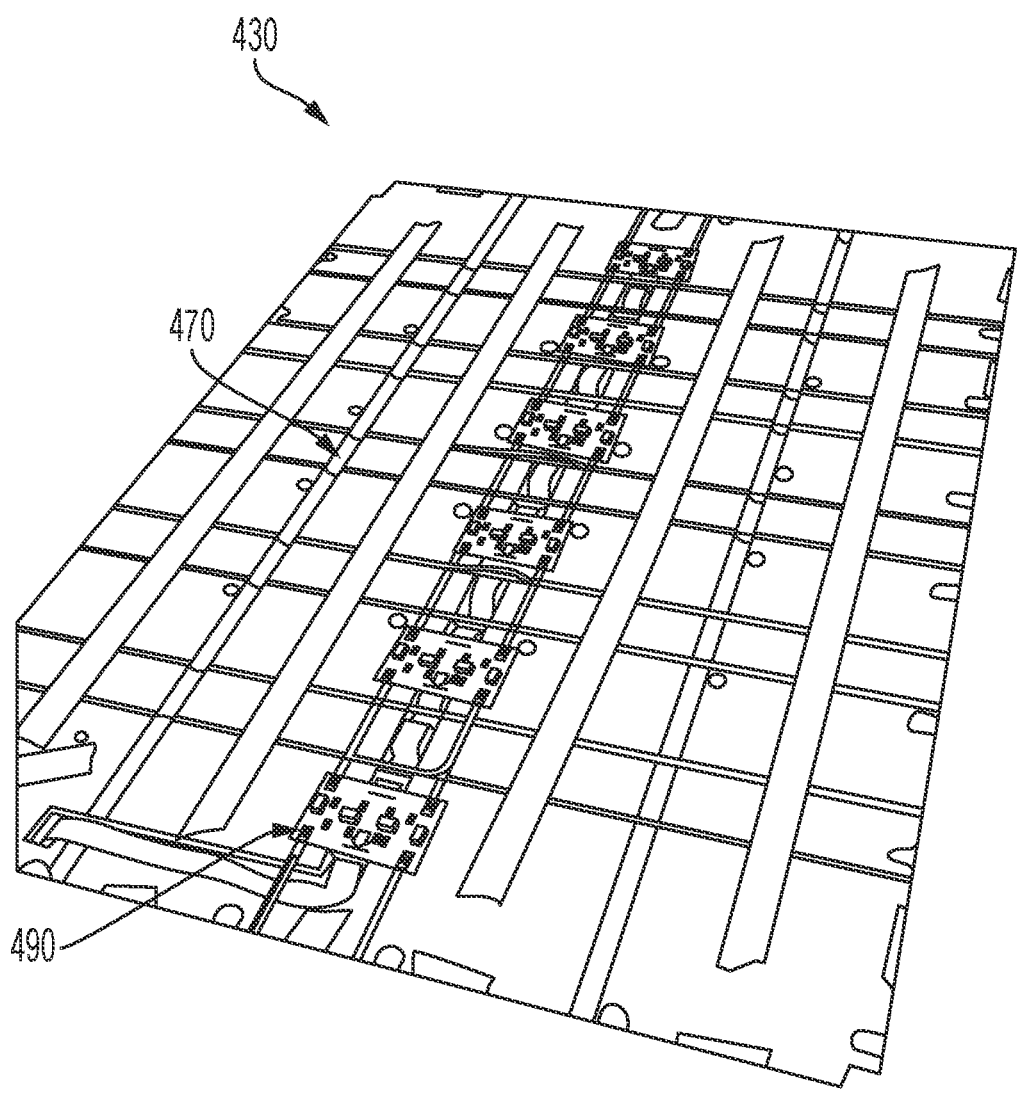
FIG. 4 illustrates an example antenna circuit of one of the shelves of the storage container in accordance with aspects of the present disclosure.

Referring now to FIG. 4, illustrated is a view of a portion of an example shelf 430, which may correspond to shelf 130 of FIG. 1, as described above. In one aspect of the disclosure, each shelf 430 may include an array of antennas 470, the antennas being distributed (e.g., overlappingly distributed) within a plurality of recessing cross-slots within a retaining material, such as polystyrene foam or other material that may be non-interfering or minimally interfering with signals communicated via the antennas 470, for example. Thus, one or more antennas 470 may overlap another antenna or other antennas located on the shelf 430. As described below, using the array of antennas 470, each shelf 430 (130 in FIG. 1) may read/detect the presence of one or more RFID tags affixed to products stored on that and/or a nearby shelf, for example. In some aspects, the array of antennas 470 may be arranged in or grouped as pairs of antennas (e.g., associated or variably associated pairs of overlapping antennas), with respective pairs of antennas in array 470 being selectively or otherwise communicatively coupled to a switching circuit 490 to control operation thereof. Additionally, each antenna of the pair of antennas in the array 470 may be formed as a loop, with a portion of the loops in the pair overlapping with one another. In one aspect of the disclosure each shelf may comprise 12 antenna loops, for example.

Figure 3:
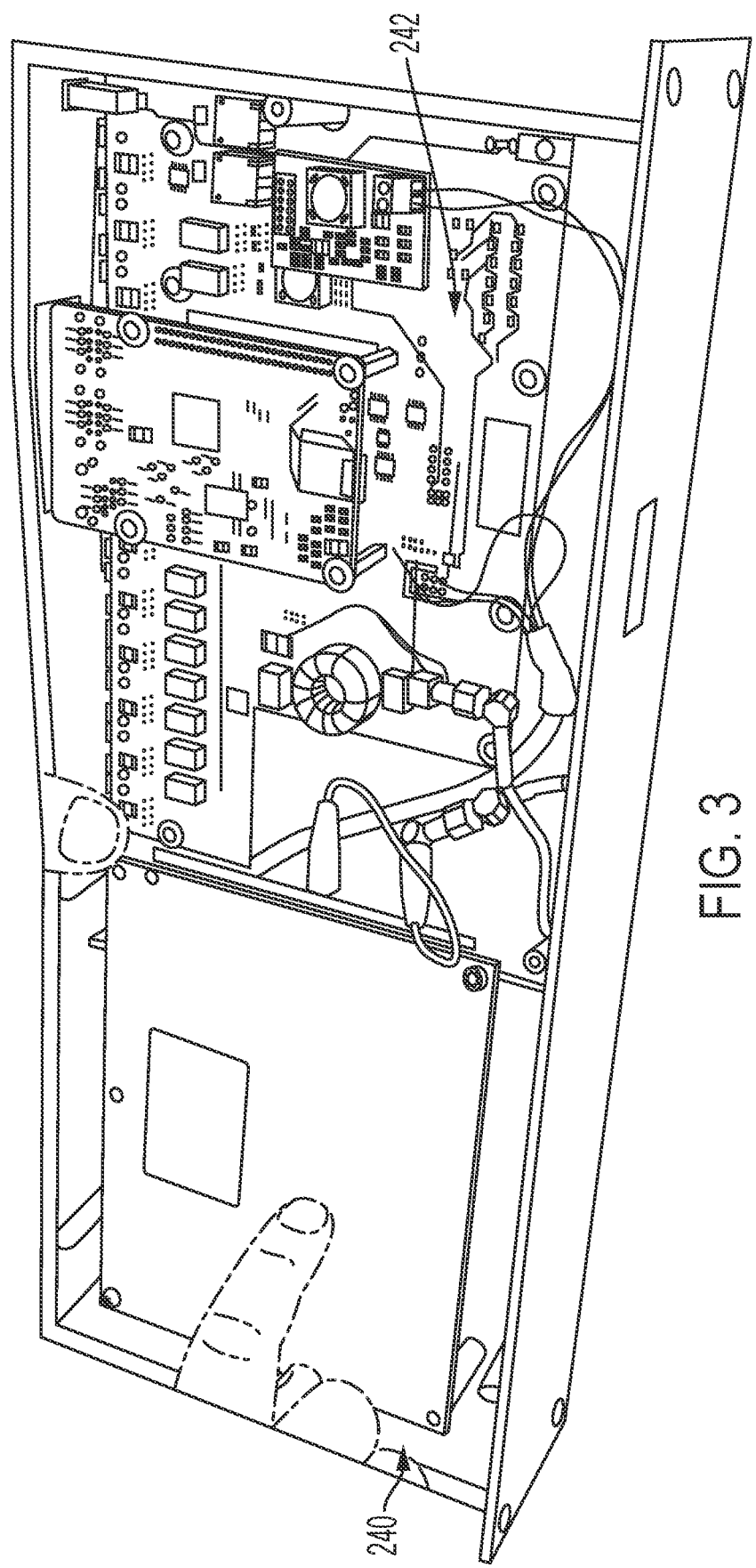
FIG. 3 illustrates an example RFID communication circuit in accordance with aspects of the present disclosure.

In one aspect of the disclosure, during operation, for example, the control unit 240 of FIGS. 2 and 3 may sequentially or otherwise selectively transmit a signal to each switching circuit 490 to activate a first loop of the pair of antenna loops, while a second loop may remain in open circuit or otherwise un-activated, and vice-versa. As a result, via a shelf 430 as illustrated in FIG. 4, each loop may thereby sequentially or otherwise selectively generate an electromagnetic field that interrogates the RFID tags affixed to products on or proximal to various regions of a corresponding shelf and detect a response from the activated RFID tags. As described below, by adjusting the power level of the signals transmitted to the shelves 130 of FIG. 1, for example, various features of the storage cabinet 100 may be used so as to more accurately determine or estimate a location of a given product.

As described above, by adjusting the power level of the signals transmitted to the shelves 130 of FIG. 1 (430 of FIG. 4), for example, various features of the storage cabinet 100 of FIG. 1 may be used to determine or estimate a location of a given product affixed with a RFID tag. For example, the power level of the transmitted signal may be increased and/or decreased to determine a threshold readability of RFID tags affixed to products proximal to each shelf or portion of each shelf (e.g., to assist in confirming and/or inferring a more precise location of each product having an RFID tag attached thereto). In further implementations, by sequentially or otherwise variably activating the switches and/or by adjusting the power level of the transmitted signals, various features of the storage cabinet 100 may be used to determine a more accurate location of a given product based on which pair(s) of antennas detect a response from a given RFID tag or tags and/or relative signal strength of signal. For example, if a plurality of antenna loops 470 of FIG. 4 each detect a response from a given RFID tag associated with a product, the power level of the transmitted signal for each antenna loop may be selectively reduced and/or raised to narrow down which antenna loop(s) variably detect a response at differing power levels, in order to determine or infer by such variable detection the likely location of the product; for example, the product may be located on a shelf nearest the antenna loop that detected the product at the lowest transmitted signal level. In this manner, various features of the storage cabinet 100 (FIG. 1) may be used to resolve multiple detections (also interchangeably referred to herein as "claims") to a particular RFID tag by a plurality of antenna loops, as described in greater detail below.

Furthermore, by using the pairs of antennas, a depth (e.g., front to back) within the volume encompassed by or near the shelf (and/or distance) at which the detected product is located may be determined or estimated. For example, if a first loop of the pair of antennas oriented relative to a front portion of the shelf detects responses from an RFID tag, rather than a second loop oriented relative to a back portion of the shelf (or vice-versa), the product may be determined to be likely located at or near the front portion (or vice-versa) of the shelf. Thus, the depth on shelf location of the product, for example, may be more accurately determined based on which antenna loop or loops detected a response from the RFID tag.

Figure 5:
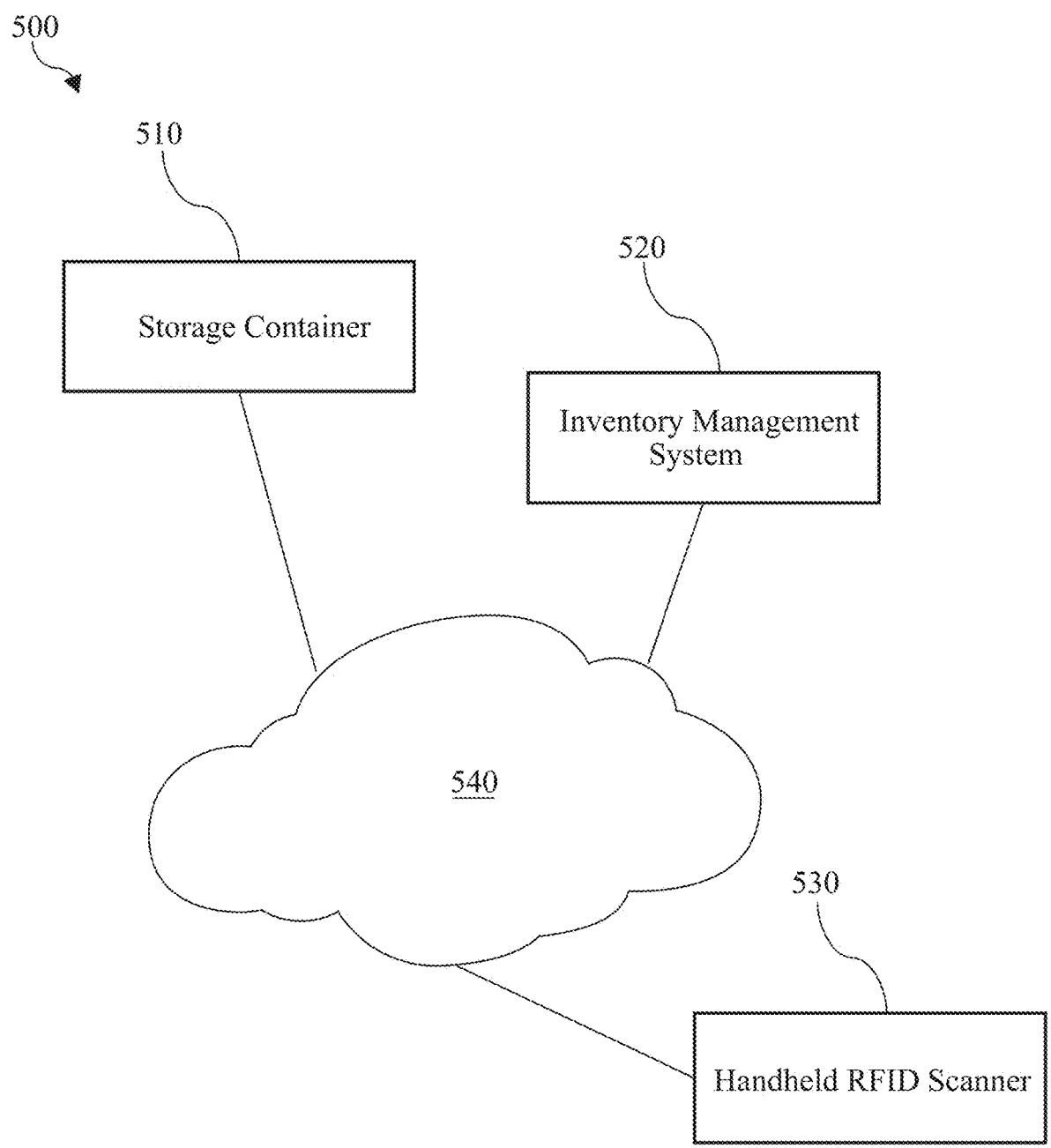
FIG. 5 illustrates an example network for managing inventory in accordance with aspects of the present disclosure.
Figure 11A:
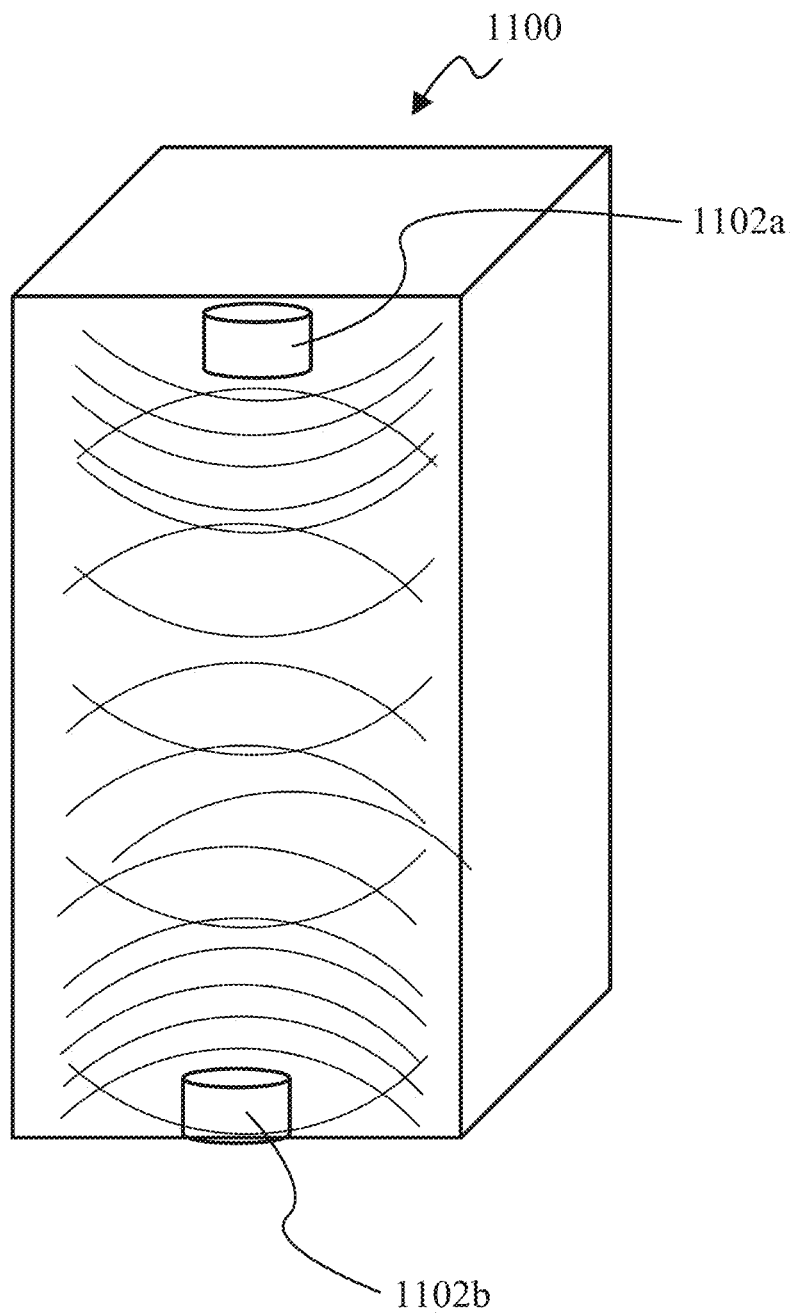
FIG. 11A illustrates a representative view of an example storage cabinet for use in accordance with aspects of the present disclosure.
Figure 11B:
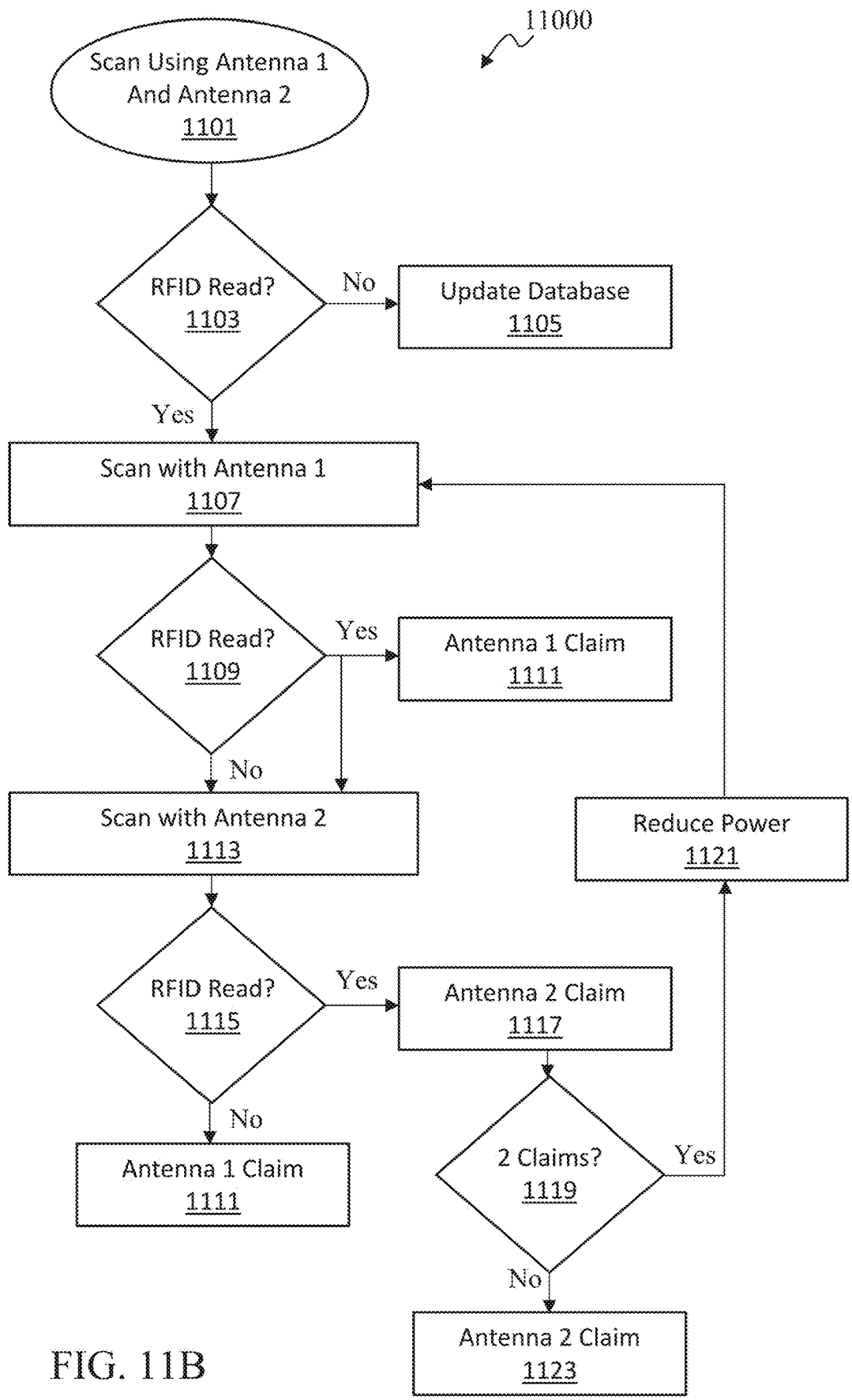
FIG. 11B illustrates a flowchart of portions of a process for one example implementation of an inventory scan in accordance with aspects of the present disclosure.
Figure 12:
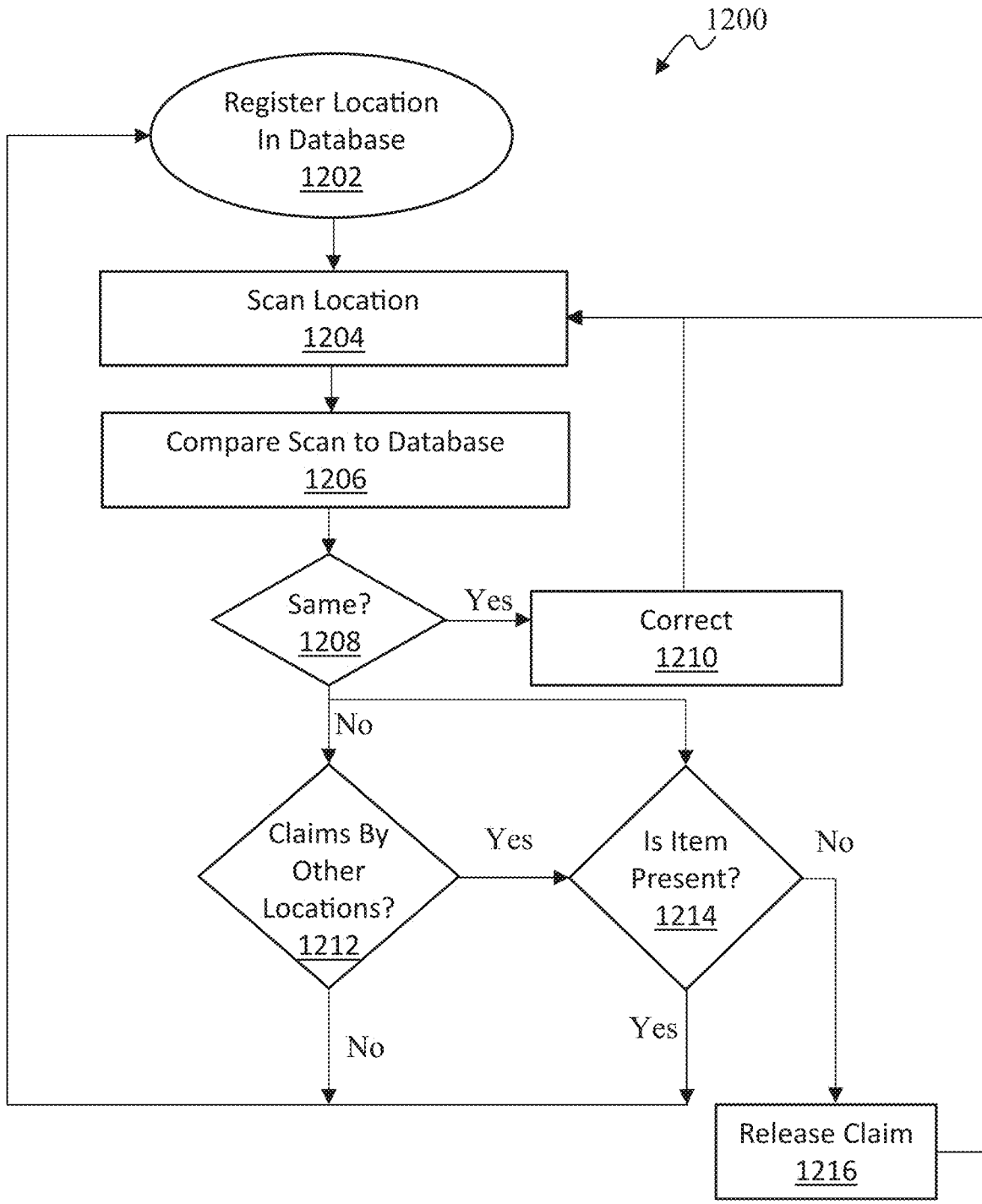
FIG. 12 illustrates a flowchart of portions of a process for one example implementation of an inventory scan in accordance with aspects of the present disclosure.

FIG. 5 illustrates a representative diagram of various features in an example system for use in filtering cross reads in accordance with aspects of the present disclosure. For example, a system 500 may include one or more storage cabinets 510 (e.g., the storage cabinet 100 of FIG. 1), an inventory management system 520, and a handheld or other RFID scanner 530, each coupled via a network 540. For example, network 540 may be used to facilitate communications among multiple system components or systems, including, but not limited to, the storage cabinet 510, the inventory management system 520, and the handheld RFID scanner 530 shown in FIG. 5. In some implementations, the network 540 may be or include the Internet or another Internet Protocol (IP) based network. The storage cabinet 510, the inventory management system 520, and/or the handheld RFID scanner 530 may include one or more computer systems, which may include one or more terminals having various features, for example, as shown in FIGS. 11A, 11B and 12 and described in conjunction therewith. In some implementations, the inventory management system 520 may also include a memory that stores instructions for executing processes for managing inventory, and a processor configured to execute the instructions.

In some implementations, among other functions, the various features of the storage cabinet 510 may identify and check inventory stored thereon, and provide such information to the inventory management system 520. Additionally, the storage cabinet 510 may also determine when a product is no longer detected within its inventory and may notify the inventory management system 520 accordingly. Using this information, the inventory management system 520 may also receive data via one or more handheld RFID scanners 530, such as to determine whether a product undetected by the storage cabinet 510 may be relocated elsewhere by a technician, medical professional, etc., via detection by the one or more of the handheld RFID scanners 530 at another location. As a result, the inventory management system 520 may determine whether the undetected product has been used or is missing from the overall inventory, such as may result as part of an effort to resolve inventory discrepancies and/or update inventory and/or carry out other inventory related activities. Additionally, via the periodic storage cabinet 510 based detection activity, updated information related to such products may regularly be transmitted to the inventory management system 520. In this way, for example, the inventory management system 520 may monitor each of the products stored by the storage cabinet 510 to determine whether there are any missing products, for example. In some aspects, various functions, such as reconciling which shelf the product is located on, may be performed locally by various components and processors within the storage cabinet 510 or may be performed remotely at, for example, the inventory management system 520, as described further below.

Figure 6:
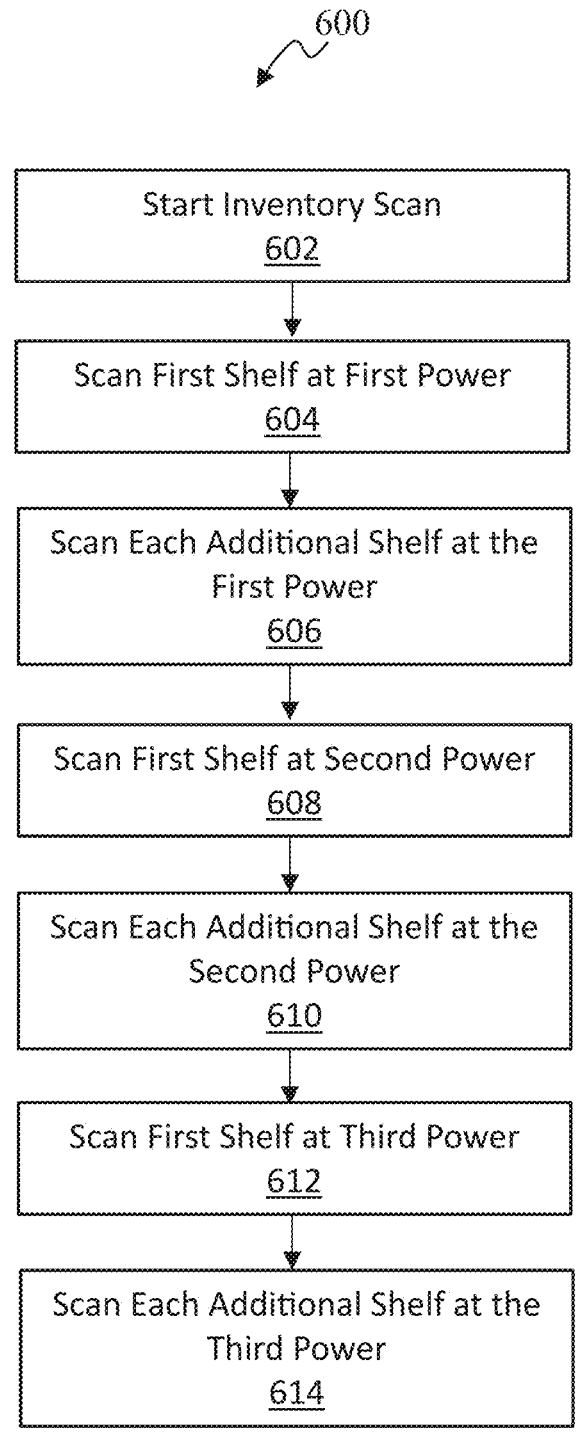
FIG. 6 illustrates a flowchart of portions of a process for one example implementation for an inventory scan in accordance with aspects of the present disclosure.

Referring now to FIG. 6, illustrated is a flowchart of a method 600 in accordance with one example implementation for conducting an inventory scan in accordance with aspects of the present disclosure. As described above, cross reads may occur when a single RFID tag is read by more than one RFID Reader. For example, when activated by a first signal, RFID Reader 1 located at position X (for example, on "shelf 1" of an example storage cabinet, such as the storage cabinet 100 of FIG. 1) may read RFID tag A, and when activated by a second signal, RFID Reader 2 located at position Y (for example, "on shelf 2" of the same storage cabinet) may also read RFID tag A. This double reading of a single RFID tag may be considered a cross read. This cross reading result may occur because RFID tag A is located in the read field of both RFID Reader 1 and RFID Reader 2. In view of this result, because both RFID Reader 1 and RFID Reader 2 have made a "claim" on RFID tag A being located their respective read fields (for example, on or near their respective shelves), a filtering method may be implemented to accurately determine the actual or a likely actual location of RFID tag A.

Referring again to FIG. 6, the method 600 may begin by starting an inventory scan at block 602. For example, as described above, storage cabinet 100 of FIG. 1, may perform an inventory scan by reading any products affixed with a RFID tag that are detected by RFID readers within the storage cabinet. A scan may include selectively powering the RFID readers located within the storage cabinet, as described above, such as with relation to FIG. 4, e.g., selective powering of the antenna loops 470.

At block 604, the storage cabinet may scan a first shelf at a first power. For example, the first power may be the lowest power operable by the storage cabinet, e.g., ¼ Watt.

At block 606, the storage cabinet may scan each additional shelf, e.g., shelves 2-12, at the same first power level, e.g., ¼ Watt. As described above, the power level may be adjusted by the attenuator located within the storage cabinet, for example.

At block 608, the attenuator may be switched off and a second inventory scan may be implemented by starting at the first shelf at a second power, e.g., 1 Watt.

At block 610, the storage cabinet may scan each additional shelf, e.g., shelves 2-12, at the same second power level, e.g., 1 Watt.

At block 612 a third inventory scan may be implemented by starting at the first shelf at a third power, e.g., 3 Watts.

At block 614, the storage cabinet may scan each additional shelf, e.g., shelves 2-12, at the same third power level, e.g., 3 Watts.

As described above, each iteration of the inventory scan may allow for multiple shelves and/or multiple storage cabinets to read the same RFID tag based on proximity of the RFID tag, thereby resulting in cross reads. For example, the higher the power the inventory scan operates at, for example 3 Watts, the greater the distance at which a given RFID tag may be read. For example, an inventory scan at 3 Watts may allow for a storage cabinet-to-storage cabinet cross read (e.g., where two storage cabinets are located in sufficient proximity to one another to result in such cross reads), but an inventory scan at ¼ Watt may not allow for a storage cabinet-to-storage cabinet cross read. In one aspect of the disclosure, although the approach of using a high power scan may cause unnecessary cross reads to occur, such approach may be necessary, for example, to ensure that all products affixed with a RFID tag are read from the immediate storage cabinet, such as to ensure proper inventory counts and/or location determinations.

Figure 7:
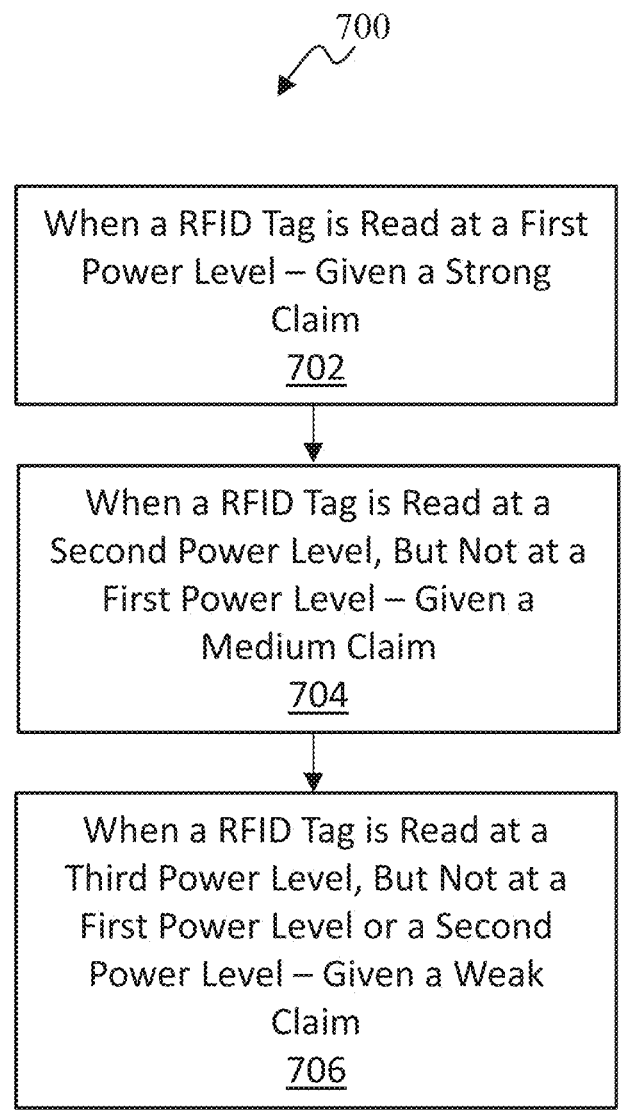
FIG. 7 illustrates a flowchart of portions of a process for one example implementation for applying claims in accordance with aspects of the present disclosure.

Referring now to FIG. 7, illustrated is a flowchart of a method 700 of one example implementation for allocating location based on claims from an inventory scan in accordance with aspects of the present disclosure. As described below, once a RFID tag is read during an inventory scan, the RFID Reader, for example, a shelf, may place a "claim" on the RFID tag. A "claim" may have different weights, for example, a strong claim, medium claim, or a weak claim, based on the strength of signal transmitted and/or detected, for example. At block 702, if a RFID tag is read by a shelf during an inventory cycle when the power is at the lowest level, for example, set to ¼ Watt. Detection at this power level by the shelf may result in a strong claim on the RFID tag. For example, shelf 1 reads RFID tag A during a first inventory scan at ¼ Watt, then RFID tag A is given a likely strong claim to presence of a product associated with RFID tag A on or proximal to shelf 1.

At block 704, if a RFID tag is read by a shelf during an inventory cycle when the power is at the second level, for example, set to 1 Watt, and not at the lowest level, for example, when set to ¼ Watt, the shelf may place a medium claim on the RFID tag. For example, shelf 2 reads RFID tag A during a second inventory scan at 1 Watt, and did not read RFID tag A at ¼ Watt, then RFID tag A is given a medium claim to shelf 2.

At block 706, if a RFID tag is read by a shelf during an inventory cycle when the power is at the highest level, for example, set to 3 Watts, and not at the lowest level or the second level, for example, when set to ¼ Watt or 1 Watt, the shelf may have a weak claim on that tag. For example, if shelf 3 reads RFID tag A during a third inventory scan at 3 Watts, and did not read RFID tag A at ¼ Watt or 1 Watt, then RFID tag A is given a weak claim to shelf 3 reflecting a low likelihood that the product associated with RFID tag A is on or proximal to shelf 3.

In one aspect of the disclosure, a given RFID tag may have a plurality of the same or similarly weighted claims by multiple different antennae and/or shelves based on cross reads. For example, shelf 1 and shelf 2 may both have a strong claim to RFID tag A based on cross reads, thereby causing both an inaccurate inventory count (e.g., the product affixed with RFID tag A may be counted twice), and also an unknown location (e.g., the product affixed with RFID tag A may be considered to be located on shelf 1 and shelf 2). To address this issue of cross reads, a filtering method of such detection claims may be implemented, such as by the device that performed the cross reads (e.g., the storage cabinet 100 of FIG. 1), or by a remote system (e.g., the Inventory Management System 520 of FIG. 5). The Inventory Management System 520 of FIG. 5, for example, as described further below, may filter cross reads when two separate devices both have a claim on the same RFID tag. For example, storage cabinet 1 and storage cabinet 2 may both have a strong claim on RFID tag A. To mediate both strong claims, a third system component, for example, the Inventory Management System 520 of FIG. 5, may be used to determine final outcome as to location of the inventory, as described further below.

Figure 8:
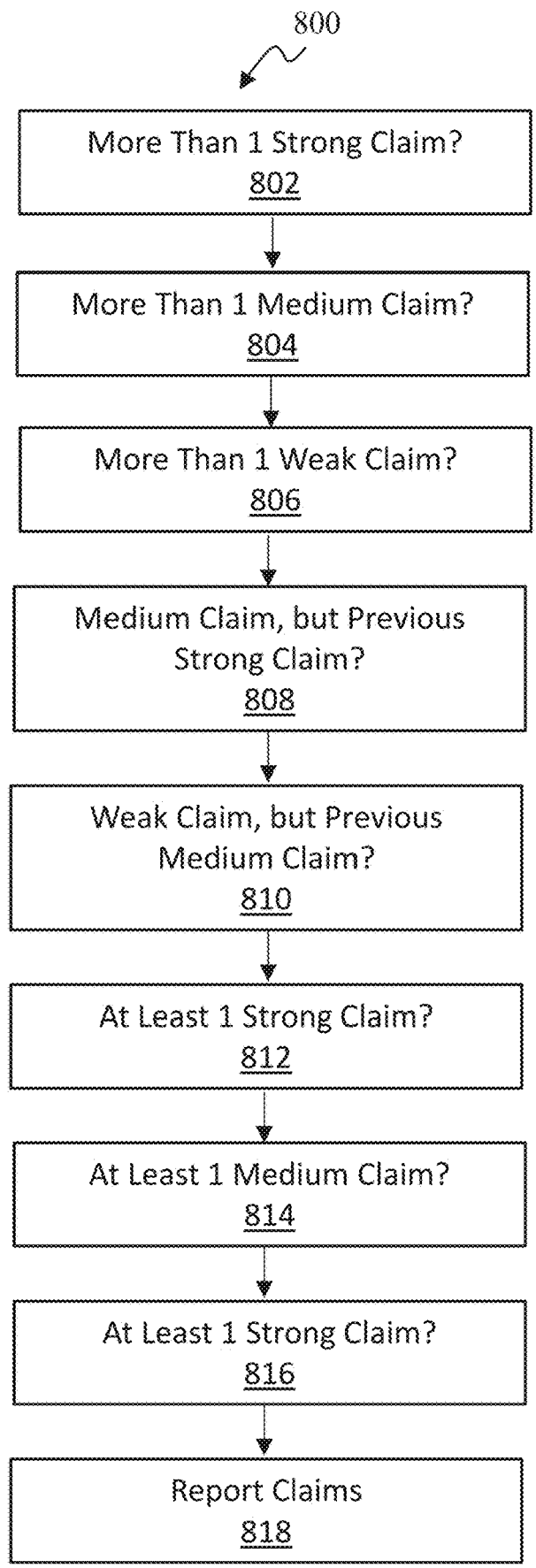
FIG. 8 illustrates a flowchart of portions of a process for one example implementation for filtering cross reads in accordance with aspects of the present disclosure.

Referring now to FIG. 8, illustrated is a flowchart of a method 800 of one example implementation for filtering cross reads from an inventory scan in accordance with aspects of the present disclosure. For example, method 800 may apply certain "rules" or steps of analysis to filter the cross reads based upon data received from a single device (e.g., the storage cabinet 100 of FIG. 1). In method 800, at block 802, a determination may be made as to whether more than one strong claim for the same RFID tag is detected. For example, the storage cabinet 100 of FIG. 1, may determine if more than one shelf has a strong claim on a particular RFID tag. If multiple shelves within a single storage cabinet have a strong claim on the RFID tag, the shelf that read the RFID tag with the largest number of antenna loops at the lowest power level, for example, ¼ Watt, may be determined to retain the strongest claim to the RFID tag, and the reaming claims by additional shelves may be demoted to medium claims.

At block 804, a determination may be made as to more than one medium claim of the same RFID tag is detected. For example, the storage cabinet 100 of FIG. 1, may determine if no shelf has a strong claim to a particular RFID tag, but more than one shelf has a medium claim on the RFID tag. If multiple shelves within a single storage cabinet have a medium claim on a RFID tag, and no shelves have a strong claim, then the shelf that read the RFID tag with the largest number of antenna loops at the second power level, for example, 1 Watt, may be promoted to a strong claim, with the others remaining at a medium level of claim.

At block 806, a determination may be made as to whether more than one weak claim of the same RFID tag is detected. For example, the storage cabinet 100 of FIG. 1, may determine if no shelf has a strong or medium claim to a particular RFID tag, but more than one shelf has a weak claim on the RFID tag. If multiple shelves within a single storage cabinet have a weak claim on a RFID tag, and no shelves have a strong or medium claim as to that RFID tag, then the shelf that read the RFID tag with the largest number of antenna loops at the highest power level, for example, 3 Watts, may be promoted to a medium claim, with the others remaining at the weak level of claim.

At block 808, a determination may be made as to whether a shelf having a medium claim on a RFID tag in a previous inventory scan had a strong claim on the same RFID tag, upon which determination, the medium claim may be promoted to a strong claim. For example, the storage cabinet 100 of FIG. 1, may determine, if a shelf has a medium claim on a RFID tag, and in a previous inventory scan it had a strong claim on the same RFID tag, that the medium claim is to be promoted to a strong claim. In one aspect of the disclosure, the previous inventory scan may be considered to be within the last 4 previous inventory scans, for example.

At block 810, a determination may be made as to whether a shelf having a weak claim on a RFID tag, but in a previous inventory scan had a medium claim on the same RFID tag, may be promoted to a medium claim. For example, the storage cabinet 100 of FIG. 1, may determine, if a shelf has a weak claim on a RFID tag, and in a previous inventory scan it had a medium claim on the same RFID tag, then the weak claim is promoted to a medium claim. In one aspect of the disclosure, the previous inventory scan may be considered to be within the last 4 previous inventory scans, for example.

At block 812, a determination may be made as to if a strong claim on a RFID tag exists, and upon which determination, the medium and weak claims are disregarded on the same RFID tag. For example, the storage cabinet 100 of FIG. 1, may determine a strong claim on a RFID tag, and all medium and weak claims may be disregarded. If exactly two shelves have a strong claim to a RFID tag, and those shelves are adjacent, the claim of the upper shelf is disregarded. The shelf with the remaining strong claim will be reported to the remote server, for example, the Inventory Management System 520 of FIG. 5, as described below.

At block 814, a determination may be made as to if a medium claim on a RFID tag exists, and no strong claims exist on the same RFID tag, and upon which determination, the weak claims are disregarded on the same RFID tag. For example, the storage cabinet 100 of FIG. 1, may determine a medium claim on a RFID tag, but no strong claims, and all weak claims may be disregarded. If exactly two shelves have a medium claim to a RFID tag and those shelves are adjacent, and there is no stronger claim, the upper shelf may be disregarded. The remaining shelf with the medium claim may be reported to the remote server, for example, the Inventory Management System 520 of FIG. 5, as described below.

At block 816, a determination may be made as to if a weak claim on a RFID tag exists, and no strong or medium claims exist on the same RFID tag, and upon which determination, the weak claims is considered the only claim on the RFID tag. For example, the storage cabinet 100 of FIG. 1, may determine a weak claim on a RFID tag, but no strong claims or medium claims, thus the shelf with the weak claim may be reported to the remote server, for example, the Inventory Management System 520 of FIG. 5, as described below.

At block 818, the claims may be reported to the remote server. For example, the claims may be reported to the Inventory Management System 520 of FIG. 5, in three steps. First, all remaining strong claims may be reported. Second, all remaining medium claims may be reported. Third, all remaining weak claims may be reported. Any given RFID tag may appear in more than one of these reports. For example, if 2 shelves have a medium claim on a RFID tag and those shelves are not adjacent, as described above, the RFID tag claim may be reported twice. This cross read conflict may be identified by the remote server, for example, the Inventory Management System 520 of FIG. 5, as described below.

Figure 9:
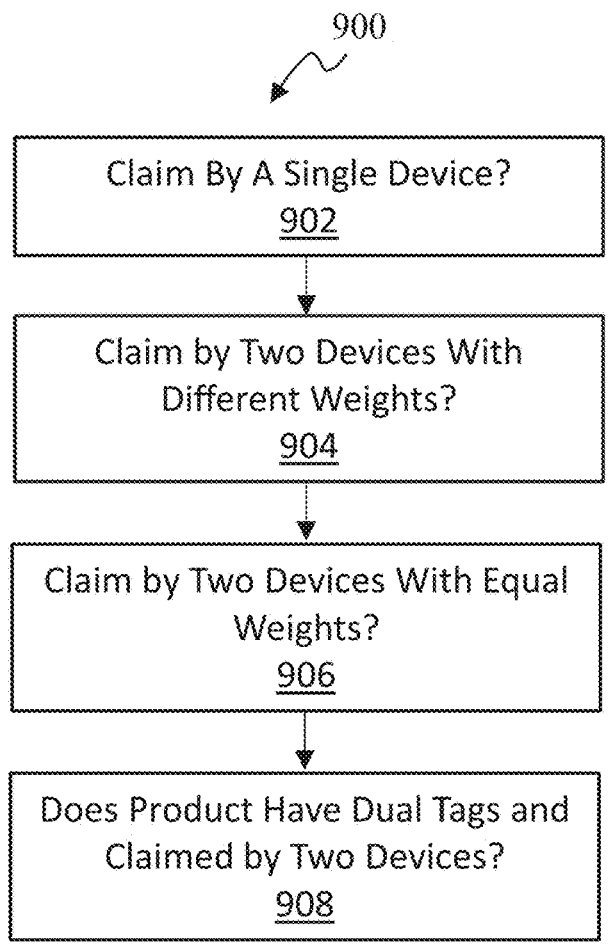
FIG. 9 illustrates a flowchart of portions of a process for one example implementation for filtering cross reads in accordance with aspects of the present disclosure.

Referring now to FIG. 9, illustrated is a flowchart of a method 900 of one example implementation for filtering cross reads from an inventory scan in accordance with aspects of the present disclosure. For example, method 900 may apply rules to filter the cross reads based upon two devices both asserting a claim for a RFID tag in conflict for two storage cabinets 100 of FIG. 1. At block 902, upon receiving the reporting from respective devices, for example, a first determination may be made as to whether the claim for a RFID tag is being made only by a single device. For example, a reporting of an RFID tag may be made by a single storage cabinet 100 of FIG. 1. The remote server, for example, Inventory Management System 520 of FIG. 5, may thereby determine that, since the RFID tag is reported only for the single device, the product affixed with the RFID tag is located in the cabinet 100 and on the claimed shelf at an area corresponding to the specific antenna loop detecting the tag. For example, if RFID tag A is read by storage cabinet 1, by shelf 1, and loop 1, then the product affixed with RFID tag A is determined to be located in that specific location. The remote server may then store the determined location and the method ends.

At block 904, a determination may be made as to whether the claim is read not by a single device, but by two devices with different weights. For example, upon receiving the reporting from respective devices, for example, two different storage cabinet along the lines of cabinet 100 of FIG. 1, the remote server, for example, Inventory Management System 520 of FIG. 5, may determine if a RFID tag is reported by more than one device and the strengths of the claims differ. In this event, the stronger claim is promoted and the weaker claim is deleted. For example, RFID tag A is reported by storage cabinet 1, by shelf 1, with a medium claim, and RFID tag A is also reported by storage cabinet 2, by shelf 2, with a weak claim, the product affixed with RFID tag A is determined to be located in storage cabinet 1 on shelf 1. The remote server may store the determined location.

At block 906, a determination may be made as to whether the claim is read not by a single device, but by two devices with equal weights, and a further determination is made as to whether more than one strength claim is made by either device. For example, upon receiving the reporting from respective devices, for example, two different storage cabinets along the lines of storage cabinet 100 of FIG. 1, the remote server, for example, Inventory Management System 520 of FIG. 5, may determine if a RFID tag is claimed by more than one device, whether the claims are of equal strength, and whether more than one claim is made by either device. If one of the devices claims the RFID tag on more shelves than another device, for example, the larger quantity of claims may be promoted and the smaller quantity may be deleted. For example, RFID tag A is reported by storage cabinet 1, by shelf 5 and shelf 6, with a medium claim for each shelf, and RFID tag A is also reported by storage cabinet 2, only by shelf 2, with a medium claim, the product affixed with RFID tag A is determined to be located in storage cabinet 1. The remote server may store the determined location based on this determination.

At block 908, a determination is made as whether a product has dual tags, for example, two separate RFID tags operating at the same or different frequencies and affixed to a single item/product or a single RFID tag comprising dual antennae operating at the same or different frequencies, and is claimed by two devices. For example, upon receiving the reporting from respective devices, for example, two storage cabinets along the lines of storage cabinet 100 of FIG. 1, the remote server, for example, Inventory Management System 520 of FIG. 5, may determine if a product is known to have two RFID tags, and if one of those RFID tags is claimed by two devices and the other RFID tag is claimed by only one of those devices, the device that claims both tags is promoted and the device that only claims only one of the tags is deleted. For example, RFID tag A and RFID tag B are reported by storage cabinet 1 as both affixed to product X, and only RFID tag A is also reported by storage cabinet 2. In this event, the product affixed with RFID tag A and RFID tag B is determined to be located in storage cabinet 1. The remote server may store the determined location based on this determination.

Figure 10:
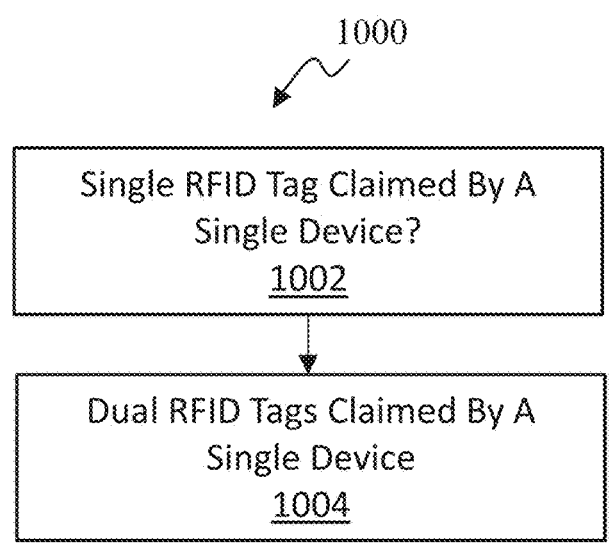
FIG. 10 illustrates a flowchart of portions of a process for one example implementation for filtering cross reads in accordance with aspects of the present disclosure.

Referring now to FIG. 10, illustrated is a flowchart of a method 1000 of one example implementation for filtering cross reads from an inventory scan in accordance with aspects of the present disclosure. For example, flowchart 1000 may apply rules to filter cross reads based upon a single device, for example, a storage cabinet 100 of FIG. 1, upon the storage cabinet 100 reporting to a remote server, as described above. At block 1002, a determination may be made as to whether a single RFID tag is claimed by a single device. For example, upon receiving the reporting from a device, such as the storage cabinet 100 of FIG. 1, the remote server, for example, Inventory Management System 520 of FIG. 5, may determine if a product is known to have only one RFID tag, and the RFID tag is claimed only by a single device, and only on a single shelf, in which case the product may be determined to be located on that shelf. For example, RFID tag A is read by storage cabinet 1, by shelf 1, and loop 1, the product affixed with RFID tag A is determined to be located in that specific location. The remote server may store the determined location based on this determination.

At block 1004, a determination may be made as to whether dual RFID tags are claimed by a single device. For example, upon receiving the reporting from a device, such as the storage cabinet 100 of FIG. 1, the remote server, for example, Inventory Management System 520 of FIG. 5, may determine if a product is known to have more than one RFID tag. In addition, all of the RFID tags are claimed by a single device, and the RFID tags are claimed by two adjacent shelves, the product may be determined to be located between those two shelves. For example, RFID tag A and RFID tag B are read by storage cabinet 1, by shelf 1 and shelf 2. In this event, the product affixed with RFID tag A and RFID tag B is determined to be located between shelves 1 and 2. The remote server may store the determined location based on this determination.

In another aspect of the disclosure, the storage cabinet, for example, cabinet 100 of FIG. 1, may be configured to operate with a single frequency of RFID readers, such as UHF RFID readers. Referring to FIG. 11A, in one example implementation, the UHF power levels (e.g., power levels ranging from 10 milliwatt to 1 watt), may be varied and inventory scans re-performed at the varied power levels, so as to isolate an item present in one cabinet from another adjacent cabinet, as described below. Furthermore, this approach may be used to approximate a location of a product affixed with a RFID tag within a storage cabinet, such as a specific location in a storage cabinet that has more than one reader-antenna combination. For example, as illustrated in FIG. 11A, in an UHF RFID cabinet 1100 that may comprise two antennas 1102a and 1102b, one antenna 1102a may be located at the top and one antenna 1102b at the bottom, respectively. For example, if at a given power level a RFID tag is read by one antenna (e.g., the top antenna 1102a), and not read by the second antenna (e.g., the bottom antenna 1102b), then the location of the product affixed with the RFID tag may be inferred to be within the top portion of the storage cabinet, and the first antenna may have the claim as to the RFID tag being located in that general location. The determined location of the product affixed with the RFID tag may then be reported to the remote server, for example, the Inventory Management System 520 of FIG. 5. The method of determining an accurate location by filtering cross reads of a product affixed with the RFID tag within the cabinet 1100, is described below in reference to FIG. 11B.

Referring to FIG. 11B, illustrated is a flowchart of a method 1100 in accordance with one example implementation for conducting an inventory scan in accordance with aspects of the present disclosure. At block 1101 the system may perform an inventory scan by a RFID enabled cabinet by activating both antennas, for example, 1102a and 1102b of FIG. 11A, at a maximum or relatively higher level of power, for example, 1 watt.

At block 1103 the system may determine if any RFID tags are read. For example, the system may activate both antennas 1102a, 1102b of the RFID reader, and both antennas my read RFID tag "A," as shown in FIG. 11A. In another aspect of the disclosure, at block 1103, the system may determine that zero RFID tags are read by either antenna. At block 1105, if the system determines that zero RFID tags are read by the system during the scan, the system may transmit a signal (e.g., to the Inventory Management System 520 of FIG. 5), indicating that no RFID tags are located within the RFID enabled cabinet and the database should be adjusted accordingly. For example, updating the database to indicate no items are located within the RFID enabled system. If at least one RFID tag is read by at least one antenna at block 1103, the system may re-scan the cabinet again using only a single antenna.

At block 1107, the RFID enabled reader may re-scan the cabinet again using only a single antenna. For example, as illustrated in FIG. 11A, only the top antenna 1102a may be activated to re-scan the cabinet.

At block 1109 the system may determine if any RFID tags are read by the single antenna. For example, as described above, if RFID tag "A" was read at block 1103, the system may determine if RFID tag "A" is read again with a single antenna at maximum power, for example, 1 watt. If the RFID tag is read at block 1109 and again at block 1103, the antenna that performed the solo scan may place a claim on the read RFID tag. For example, antenna 1 may have a claim on RFID tag "A." Regardless if a RFID tag is read at block 1109, at block 1113 the system may perform a second scan activating only the antenna that was not previously activated. For example, if antenna 1102a was activated at block 1107, antenna 1102b may be activated at block 1113.

At block 1115 the system may determine if any RFID tags are read by the single antenna. For example, as described above, if RFID tag "A" was read at block 1103, the system may determine if RFID tag "A" is read again with a single antenna at maximum power, for example, 1 watt. If the RFID tag is read at block 1103 and again at block 1115, the antenna that performed the solo scan may place a claim on the read RFID tag. For example, antenna 2 may now have a claim on RFID tag "A." In another aspect of the disclosure, if the RFID tag is read at blocks 1103, 1109, and 1115, both antennas may have a claim on RFID tag "A." At block 1119, the system may determine if a single RFID tag has two claims. If the system determines that two claims are attached to a single RFID tag, the system at block 1121 may reduce the power and perform the method again. In one aspect of the disclosure, by continuing to reduce the power at each iteration when two claims are found on a single RFID tag, the system may be able to further define a location of the RFID tag affixed to a product. For example, when scanning at 1 watt if two claims are associated with RFID tag "A," and a scan at ½ watt also finds two claims on RFID tag "A," but at a scan of ¼ watt, only antenna 1 has a claim to RFID tag "A," the system may be able to determine that the product affixed with RFID tag "A" is located near the middle of the cabinet, but closer to the top or bottom portion of the cabinet based on the lowest power claim on the RFID tag.

In another aspect of the disclosure, the systems and method described above with reference to the storage cabinet 100 of FIG. 1 may be implemented with a UHF handheld RFID reader, rather than RFID enabled readers within the storage cabinet. For example, some storage cabinets may already be in use within facilities, i.e., previous versions of storage cabinets lacking RFID enabled readers. Although products affixed with RFID tags may be placed in storage cabinets lacking RFID enabled readers, there may be a lack of interoperability between these "dumb" storage cabinets and the "smart" storage cabinets, as described above in relation to 100 of FIG. 1. In order to bridge the gap between these two storage cabinet designs, and to ensure all products affixed with RFID tags are properly accounted for, e.g., quantity and location, a method of use of a portable UHF handheld reader may be implemented.

As described above, products affixed with RFID tags may be placed within "smart" cabinets comprising RFID enabled readers, such as cabinet 100 of FIG. 1, or in "dumb" storage cabinets not comprising RFID enabled readers. A user may enter a location equipped with a UHF handled reader in order to read products affixed with RFID tags located within "dumb" storage cabinets. The UHF handheld reader may have wireless and/or wired connectivity to a remote server, such as the Inventory Management System 520 of FIG. 5, described above. In one aspect of the disclosure, because UHF handheld readers are mobile and can be activated to read RFID tags in any location, the user may first assign a location with regard to which the RFID tags are being read. For example, the user may select on the RFID handheld reader via a keypad, screen, display etc., "cabinet 2, shelf 2," and then proceed with scanning products affixed with RFID tags at that specific location. As described above, for example, the RFID handheld reader may then transmit this information back to the Inventory Management System 520 of FIG. 5.

Referring now to FIG. 12, illustrated is a flowchart of various aspects of a method 1200 in accordance with one example implementation for conducting an inventory scan in accordance with aspects of the present disclosure. As described above, and further described below, at block 1202, a user may register a location on the RFID handheld reader of a specific location that is about to be scanned. In another aspect of the disclosure, at block 1202 products affixed with RFID tags may be registered in a database at a specific location (e.g., such database may be included in the Inventory Management System 520 of FIG. 5). For example, the location of a product affixed with a RFID tag may be initially set by the user in the database for a comparison conducted at a later time. At block 1204, a user may scan with a RFID handheld reader or a fixed RFID reader, or attempt to scan in another manner as described below, a specific location. The specific location may comprise an area containing products affixed with RFID tags. At block 1206, the RFID reader may transmit the data obtained during the scan to a database (e.g., the Inventory Management System 520 of FIG. 5). At block 1208 the database may compare previously stored data pertaining to a product affixed with a RFID tag with the currently received data from the reader from block 1206. At block 1208, the database determines if the currently scanned location of a specific product matches the location previously stored in the database. At block 1210, if the current location of the product affixed with the RFID tag is the same as the previously stored location, the claim may be considered strong. For example, in one aspect of the disclosure, if a RFID tag is frequently read in the same location and frequently confirmed by additional scans, the claim on the RFID tag may be reinforced, thereby increasing the weight of the claim. Referring again to block 1210, the method may start over at block 1204 thereby performing additional periodic scans of the location to continuously monitor/update the inventory and/or location of products affixed with RFID tags. As described above, the periodic scanning of a location may be user defined or random. If the database determines that the currently scanned location of the specific product does not match the location previously stored in the database, the method moves to block 1212.

At block 1212, the database determines if another RFID reader, fixed or handheld, for example, has also made a claim on the specific product. At block 1212, if no other RFID reader has an existing claim on the specific product, the database may be updated to reflect the new current location of the product automatically or prompt a user to confirm the change, as described below. As described above, additional confirmations regarding a location of a RFID tag may increase the strength of a claim. The ability for a user to confirm or deny a change may allow the system to adjust for misinformation entered into the system. At block 1212, if another RFID reader has made a claim on the specific product, the method moves to block 1214. At block 1214, the method implements a process for determination if the specific product is actually located in the current location, as described below. If the product is currently located in the current location, the database is updated to reflect the new current location of the product. If the product is not currently located in a new location, the determination process may indicate an erroneous cross read, the claim on the product may be released at block 1216, and the method may start again at block 1204. In one aspect of the disclosure, the strength of the claim may be reduced or increased based upon numerous changes in location reads of the RFID tag or numerous same location reads of the RFID tag, respectively.

In another aspect of the disclosure, when a conflict exists between the RFID tag scanned by the user with RFID handheld reader and data that was previously stored in the remote server, as described above, the RFID handheld reader may prompt the user to confirm or provide other information as to the conflict. For example, a user may intend to scan "cabinet 2, shelf 2" but proceeds with scanning "cabinet 2, shelf 3." Upon the data being transmitted to the remote server to update the location of the products affixed with the RFID tags, for example, RFID tag A, the remote server may transmit a prompt back to the user indicating that a previous scan of RFID tag A indicated the product to be located at "cabinet 2, shelf 3." The user may determine that the scan was improper, for example, that the user was actually scanning "cabinet 2, shelf 3" instead of "cabinet 2, shelf 2," and proceed with not updating the location of RFID tag A. In another example, a user may intend to scan "cabinet 2, shelf 2" and proceeds with scanning "cabinet 2, shelf 2." Upon the data being transmitted to the remote server to update the location of the products affixed with the RFID tags, for example, RFID tag A, the remote server may transmit a prompt back to the user indicating that a previous scan of RFID tag A indicated the product to be located at "cabinet 2, shelf 3." The user may determine that the scan was correct, for example, scanning "cabinet 2, shelf 2" and proceed with accepting the updated location of RFID tag A. Although different shelves are specifically referenced in the above example, location of different cabinets, rooms, pallets, etc., may also be implemented along the lines of the example described above.

In another aspect of the disclosure, when a conflict exists between the RFID tag scanned by the user with RFID reader and data that was previously stored in the remote server, as described above, the RFID handheld reader may prompt the user to confirm or provide other information as to resolve the conflict. In one aspect of the disclosure, a conflict may be generated based upon a cross read by the RFID handheld reader, as described in greater detail below. For example, a user may intend to scan "cabinet 2, shelf 2" and proceeds with scanning "cabinet 2, shelf 2," but based upon the power level of the RFID handheld reader, for example, a UHF RFID handheld reader operating at 1 watt, the user may also unintentionally read RFID tags located on adjacent shelves and/or cabinets. In one aspect of the disclosure, the cross read data obtained by the RFID handheld reader in this example may be transmitted to the remote server to update the location of the read products affixed with the RFID tags. For example, RFID tag A may be read unintentionally via a cross read, and the data may be transmitted to the remote server. The remote server may transmit a prompt back to the user via the RFID handheld reader indicating that a previous scan of RFID tag A indicated the product to be located at "cabinet 2, shelf 3." Thus, "cabinet 2, shelf 3" has a claim on RFID tag A. The user may determine that the current scan by the handheld reader acquired a cross read and improperly read a different and/or additional shelf; for example, the user may be determined to have actually been scanning "cabinet 2, shelf 2" but in addition read RFID tags of "cabinet 2, shelf 3." The user may check the location of RFID tag A and proceed with not updating the location of RFID tag A if it was read via a cross read, for example.

In another aspect of the disclosure, when a conflict exists between the RFID tag scanned by the user, such as with a RFID handheld reader, and data that was previously stored in the remote server, as described above, the RFID handheld reader may not prompt the user to confirm or provide other information as to the conflict. For example, at time X, RFID tag A is read at location 1 by a RFID handheld reader. At time Y (any time after time X), RFID tag A may be re-read by a RFID handheld reader at location 1, reinforcing the claim of location 1 on RFID tag A. Or, as described above, at time X, the user may be requested by the system to confirm that the location of RFID tag A is correctly at location 1, also reinforcing the claim of location 1 on RFID tag A. If RFID tag A is then read at a later point in time while reading location 2, the system may compare the claim of location 2 to location 1 in order to infer the actual location. If the claim of location 2 is weaker than the claim of location 1, location 1 may retain the claim on RFID tag A. If, however, the claim of location 2 is or at some point in time becomes greater than the claim of location 1, then the system may infer that RFID tag A is actually located at or has been moved to location 2, and update the stored information about the location of RFID tag A.

In another aspect of the disclosure, the RFID reader may acquire a cross read among locations within a facility based upon the power level of the RFID reader (e.g., a handheld reader). For example, a user may scan a location with a UHF handheld reader set to 1 watt. The user may first input to the handheld reader that the scanning is occurring in "Room X." In one aspect of the disclosure, Room X may be a storage area, a location with a large quantity of products affixed with RFID tags, etc. Further, Room X may be located adjacent to another of the same or similar room type, referred to as "Room Y." Upon the user scanning Room X with the RFID handheld reader, the reader may acquire a cross read from adjacent Room Y based on the RFID handheld reader operating on the UHF band and being set at 1 watt (such that the signal penetrates through the walls of Room X into Room Y). The cross read may result in detection of additional products affixed with RFID tags located in Room Y. When the cross read data is transmitted to the remote server, indicating the location of a read product, the location may conflict with previously stored data. For example, the location of RFID tag A may previously be stored in the database as being within Room Y. When the user scans Room X but unintentionally acquires a cross read from Room Y, thereby reading RFID tag A, the remote server may transmit a prompt back to the user indicating that a previous scan of RFID tag A indicated the product to be located at Room Y. Thus, Room Y has a claim on RFID tag A. The user may determine that the current scan by the handheld reader acquired a cross read and may have improperly read additional products currently located in Room Y. The user may check the physical location of RFID tag A and proceed with not updating the location in the database of RFID tag A if the physical location is confirmed as Room Y.

Further, although UHF is specifically referenced with regards to the aspect of the disclosure above with regard to the handheld reader, any suitable frequency band, e.g., LF, HF or UHF, may so be implemented.

In another aspect of the disclosure, if a handheld RFID reader, as described above, scans a product affixed with a RFID tag, which is located within a "smart" storage cabinet along the lines described above, the data provided to the remote server by the handheld RFID reader may be disregarded by the remote server, as the "smart" storage cabinet may be considered a more accurate read. For example, if a user is attempting to scan a "dumb" cabinet and enters in "cabinet 1, shelf 2" to the handheld reader, but erroneously scans a "smart" cabinet, for example, "cabinet 2," the data pertaining to the RFID tag may be transmitted to the remote server indicating a product affixed with the RFID tag in the "smart" cabinet is in conflict with the data previously stored by the remote server. Rather than prompting a user to accept or deny these changes, as described above, the remote server may disregard the data provided by the handheld RFID reader, as the "smart" cabinet is considered to have a stronger claim on the RFID tag. In another aspect of the disclosure, the user may accept the changes and update the data stored within the remote server to indicate the read from the handheld RFID device, but when the "smart" cabinet performs another inventory scan in the course of operation, the data within the remote server may automatically be adjusted to correct the erroneous input by the handheld RFID reader.

In another aspect of the disclosure, a RFID handheld reader and/or cabinet may also take into consideration the Received Signal Strength Indicator ("RSSI") from the reader thereof, in conjunction with the operating power of the reader, when determining a strength of a claim on a product affixed with a RFID tag. For example, when a RFID reader is adjusted to operate at a lower power, a fewer number of RFID tags may receive the interrogation signal from the reader based on a signal loss caused by the distance between the reader and the tags. In contrast, when a RFID reader may be adjusted to operate at a higher power, a greater number of RFID tags may receive the interrogation signal from the reader based on a lower signal loss caused by the distance between the reader and the tags. Additionally, during a scan by a RFID reader, RFID tags receiving the interrogation signal may respond multiple times to the RFID reader. Thus, responses generated by the RFID tags may be correlated to the strength of the interrogation signal received from the RFID reader. For example, the RFID reader may be operating at a low power of ¼ watt. RFID tag A at location 1 may receive the interrogation signal, and may send numerous response signals back to the RFID reader at a high RSSI value during the time period over which RFID tag A receives the interrogation signal. Based on the high RSSI and multiplicity of response signals received from RFID tag A, the RFID reader may place a strong claim on RFID tag A at location 1.

In another example, the RFID reader may be operating at a high power of 1 watt. RFID tag B at location 2 may receive the interrogation signal, and may send a single response signal back to the RFID reader at a low RSSI value during the time period over which RFID tag B receives the interrogation signal. Based on the low RSSI and singularity of the response signal received from RFID tag B, the RFID reader may place a weak claim on RFID tag B at location 2.

Further, based upon the examples described above, the system may: 1) adjust the location of RFID tag A in the database to location 1 based upon the currently determined strong claim if tag A was previously located in a different location; 2) the system may reinforce the claim of location 1 of RFID tag A in the database if tag A was previously located in the same location.

In another aspect of the disclosure, a RFID reader (e.g., handheld, mobile, cabinets, etc.) operating in either the HF or UHF range, may first apply a strong claim to an item affixed with an RFID tag based on an initial/first read of the RFID tag at a first location. For example, when a new item affixed with an RFID tag is added to the system, for example, Inventory Management System 520 of FIG. 5, based on scanning the RFID tag and assigning a first location, a strong claim is assigned to the first location of the item. Additional items may be added to the system at a second location, as described above, and a strong claim to the additional items at the second location may be assigned. When the new item currently located at the first location is read by a RFID reader at the second location, cross reads at the second location are excluded/deleted/discarded based on the strong claim of the initial/first read. The same understanding may be applied to the additional items located at the second location read by an RFID reader at the first location and so forth.

As described above in relation to adjusting the operating power of the RFID reader, in one aspect of the disclosure, a user may manually increase or decrease the operating power of the RFID handheld reader. In another aspect of the disclosure, the effective operating power may be implicitly increased or decreased as a user of the RFID reader moves closer to or farther from a RFID tag. For example, although a RFID reader may be located at the front of location 1, for example, the products affixed with RFID tags to be read may be located at the rear of location 1. Thus, although the RFID reader may be operating at a high power, the distance between the tags and the reader may be large, thereby providing a low effective operating power. These types of factors may be taken into consideration, and the weight of the claims may be adjusted accordingly.

As described above, cross reads may be filtered based on different criteria to better determine the location of an item affixed with an RFID tag depending upon the frequency range being implemented. For example, as described above, when operating in either of the HF or UHF ranges the filtering of the strength of a claim to an item affixed with an RFID tag may be based on the RFID reader power level applied; the number of antennae reading and reporting the RFID tag (e.g., the antenna cluster); and the prior establishment of a claim to an item (claim based from a prior read session). In another example, as described above, when operating in only the UHF range the filtering of the strength of a claim to an item affixed with an RFID tag may be based on the number of times the RFID tag is read by a specific antenna during a single read session, and based on the RSSI. In another example, as described above, when operating in combination of the HF and UHF ranges the filtering of the strength of a claim to an item affixed with an RFID tag may be based on a claim by a HF RFID reader being a higher weight that a claim by a UHF RFID reader. In another example, as described above, when operating in either HF or UHF or HF in combination with UHF ranges the filtering of the strength of a claim to an item affixed with an RFID tag may be based on the user inputs (e.g., when the system prompts the user to confirm or reconcile the location of the item after a read session/scan).

As described above, the location of products affixed with RFID tags read by different RFID readers (e.g., different reader-antenna combinations described above) may be resolved by comparing claims for each location that a reader may have on a specific RFID tag, and assigning the location of that tag to the location with the strongest claim on that specific RFID tag in a database. The location information in the database may then be presented to a user, for example, to illustrate the locations of inventory at any point in time or over a period of time, so as to facilitate the ability of the user to physically confirm the location.

Figure 13:
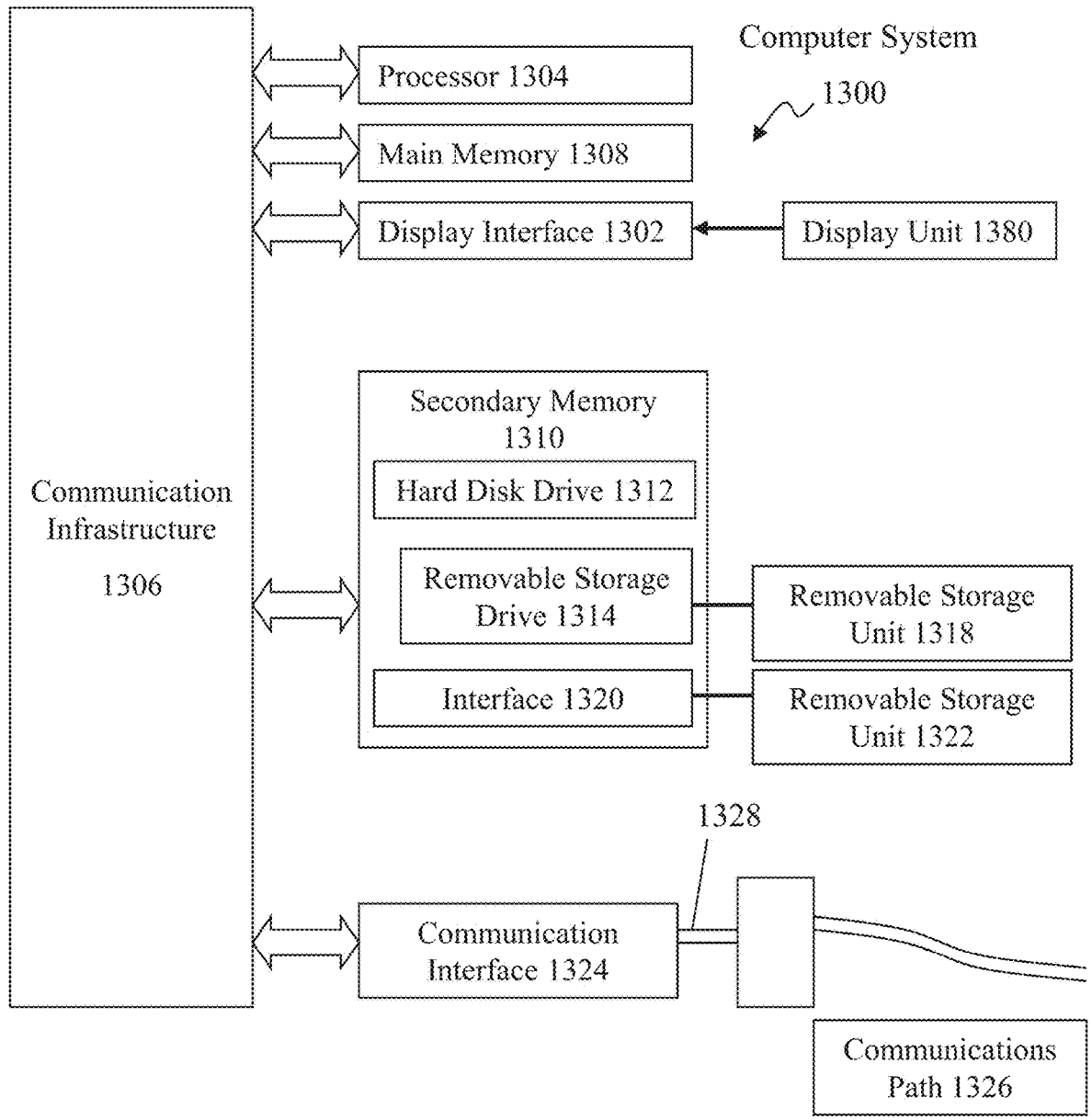
FIG. 13 illustrates various features of an example computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 1300 is shown in FIG. 13.

Computer system 1300 includes one or more processors, such as processor 1304. The processor 1304 is connected to a communication infrastructure 1306 (e.g., a communications bus, cross-over bar, or network). Various software implementations are described in terms of this example computer system. After reading this description, it will become apparent to a person skilled in the relevant art(s) how to implement implementations of the disclosure using other computer systems and/or architectures.

Computer system 1300 may include a display interface 1302 that forwards graphics, text, and other data from the communication infrastructure 1306 (or from a frame buffer not shown) for display on a display unit 1380. Computer system 1300 also includes a main memory 1308, preferably random access memory (RAM), and may also include a secondary memory 1310. The secondary memory 1310 may include, for example, a hard disk drive 1312, and/or a removable storage drive 1314, representing a floppy disk drive, a magnetic tape drive, an optical disk drive, a universal serial bus (USB) flash drive, etc. The removable storage drive 1314 reads from and/or writes to a removable storage unit 1318 in a well-known manner. Removable storage unit 1318 represents a floppy disk, magnetic tape, optical disk, USB flash drive etc., which is read by and written to removable storage drive 1314. As will be appreciated, the removable storage unit 1318 includes a computer usable storage medium having stored therein computer software and/or data.

Alternative implementations of the present disclosure may include secondary memory 1310 and may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328, which may be electronic, electromagnetic, optical or other signals capable of being received by communications interface 1324. These signals 1328 are provided to communications interface 1324 via a communications path (e.g., channel) 1326. This path 1326 carries signals 1328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage unit 1318, a hard disk installed in hard disk drive 1312, and signals 1328. These computer program products provide software to the computer system 1300. Implementations of the present disclosure are directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features in accordance with implementations of the present disclosure, as discussed herein. In particular, the computer programs, when executed, enable the processor 1304 to perform the features in accordance with implementations of the present disclosure. Accordingly, such computer programs represent controllers of the computer system 1300.

In an aspect of the present disclosure where the disclosure is implemented using software, the software may be stored in a computer program product and loaded into computer system 1300 using removable storage drive 1314, hard drive 1312, or communications interface 1320. The control logic (software), when executed by the processor 1304, causes the processor 1304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 14:
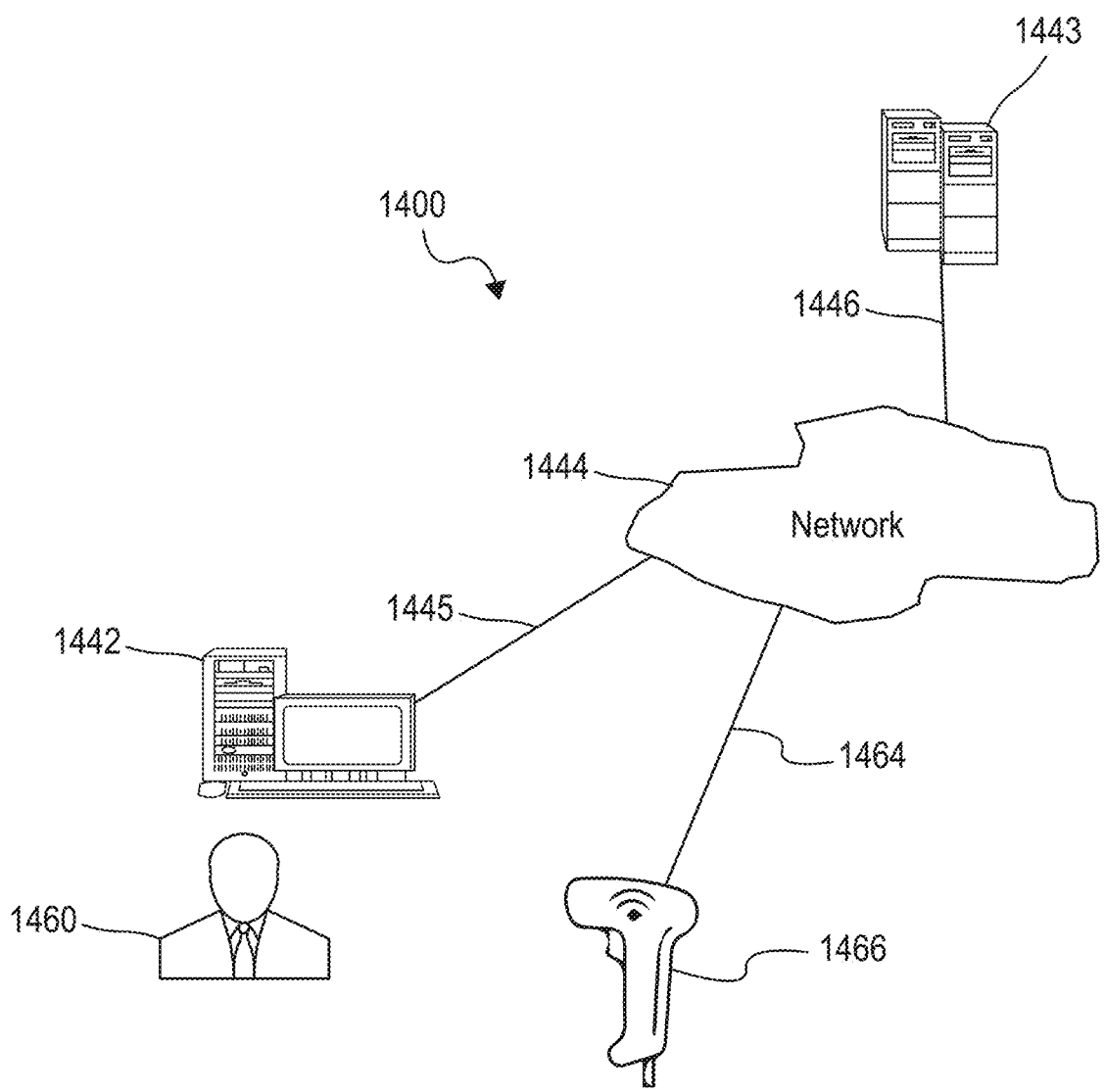
FIG. 14 illustrates a block diagram of various example system components, in accordance with aspects of the present disclosure.

FIG. 14 is a block diagram of various example system components, in accordance with aspects of the present disclosure. FIG. 14 shows a communication system 1400 including one or more accessors 1460 (also referred to interchangeably herein as one or more "users"), one or more terminals 1442 and one or more peripheral input devices 1466. Terminal 1442 and peripheral input device 1466 can include systems 510, 520 and 530, described above, or a related system, and/or the like. In one aspect, data for use in accordance with aspects described herein may be input and/or accessed by accessors 1460 via terminal 1442, or peripheral input device 1466, such as personal computers (PCs), minicomputers, mainframe computers, microcomputers, telephonic devices, or wired/wireless devices, such as personal digital assistants ("PDAs") and RFID readers (e.g., handheld, mobile, cabinets, etc.) coupled to a server 1443, such as a PC, minicomputer, mainframe computer, microcomputer, or other device having a processor and a repository for data and/or connection to a repository for data, via, a network 1444 for instance, such as the Internet or an intranet, and couplings 1445, 1446, 1464. The terminal 1442 and/or peripheral input device 1466 may be used to "claim," add or scan the RFID tag to the systems, described above. Further, the terminal 1442 peripheral input device 1466 may be implemented to monitor, remove, add, scan, etc. the RFID tags of the system described above. The couplings 1445, 1446, 1464 may include wired, wireless, or fiber optic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

Figure 15A:
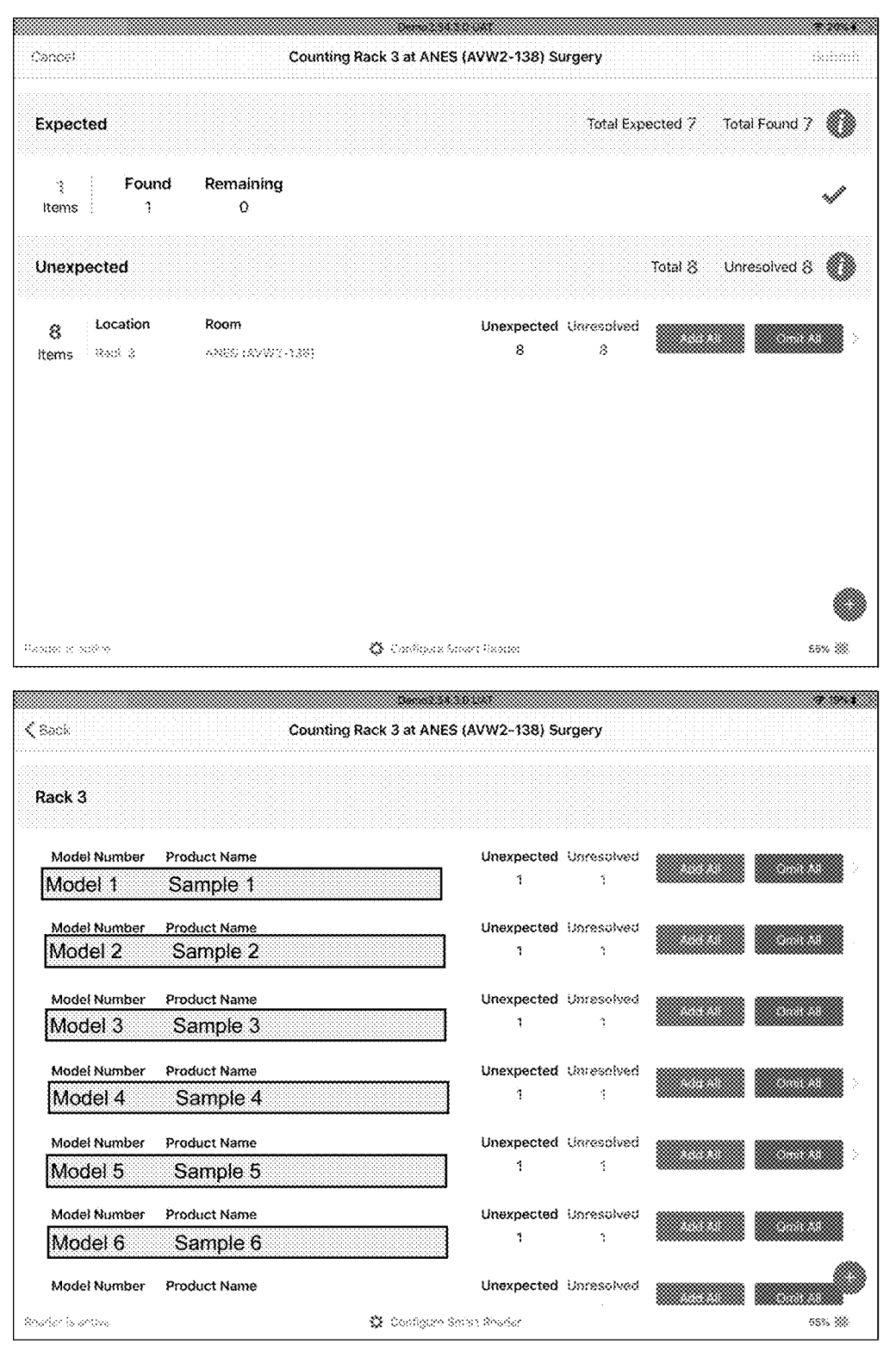
Figure 15B:
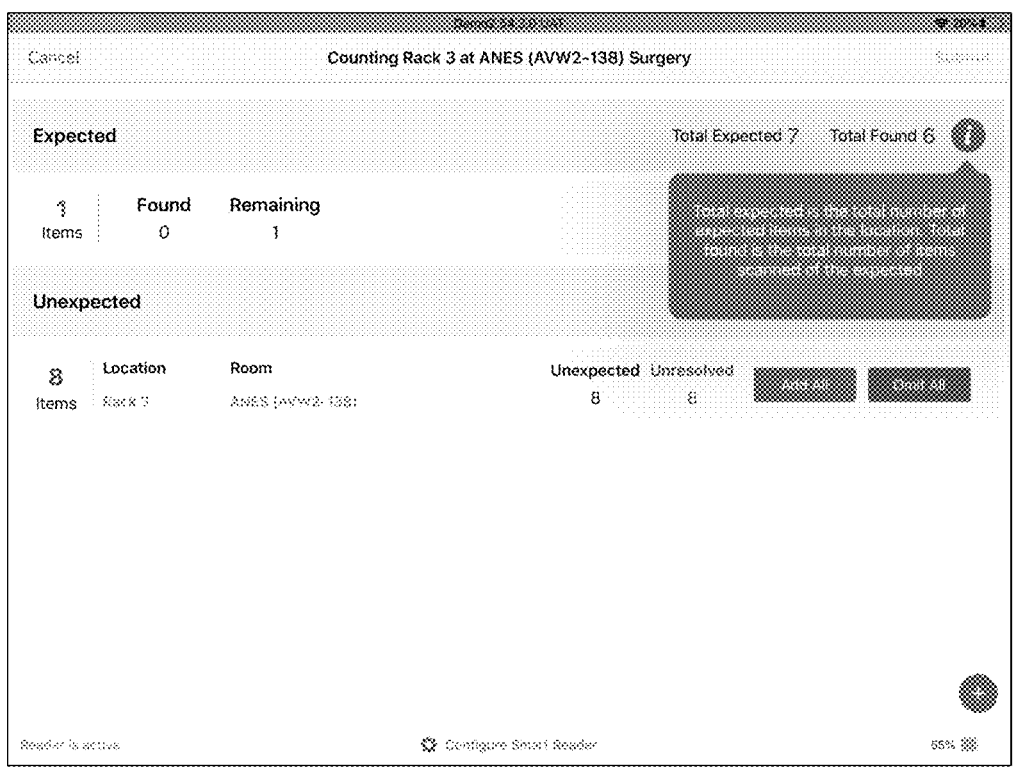
Figure 15B:
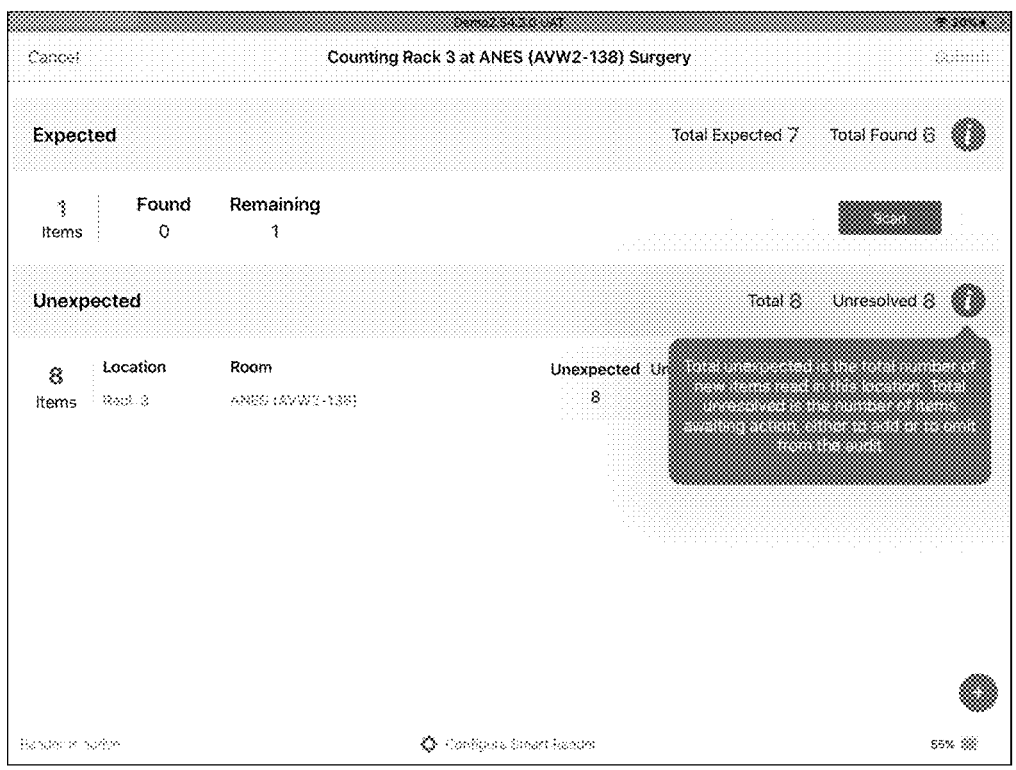

FIG. 15A and FIG. 15B demonstrate the efficiency of the proposed device and method as an example test application. It would be apparent to a person skilled in the relevant art(s) how the results illustrated in FIG. 15A and FIG. 15B are an improvement to prior devices and methods.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A system, comprising:
    a radio frequency identification (RFID) storage container comprising a control unit and a first shelf and a second shelf each having an array of antennas therein, configured to:
    transmit, via the control unit, a first RFID emission signal to the first shelf and the second shelf of the RFID storage container;
    emit, via the array of antennas, a first electromagnetic signal in response to receipt of the first RFID emission signal;
    receive, from one or more RFID tags associated with one or more corresponding products stored on the first shelf or the second shelf, a responsive signal from one or more RFID devices upon corresponding receipt of the first electromagnetic signal;

assign a first weight to each responsive signal from the one or more RFID devices indicating a location within the RFID storage container of the one or more corresponding products;

transmit, via the control unit, a second RFID emission signal to the first shelf and the second shelf of the RFID storage container;

emit, via the array of antennas, a second electromagnetic signal in response to receipt of the second RFID emission signal;

receive, from one or more RFID tags associated with one or more corresponding products stored on the first shelf or the second shelf, a responsive signal from the one or more RFID devices upon corresponding receipt of the second electromagnetic signal;

assign a second weight to the responsive signal from the one or more RFID devices indicating a location of the one or more corresponding products, wherein the first weight is a higher weight than the second weight; and promote the second weight to the first weight when the system fails to assign the first weight, wherein the transmit, emit, receive, and assign are performed for a plurality of shelves within the RFID storage container, and wherein the promotion of the second weight is based on the first shelf or the second shelf which receives the responsive signal at a largest number of antennas from the array of antennas.

2. The system of claim 1, wherein the first electromagnetic signal is at a lower power than the second electromagnetic signal.

3. The system of claim 1, wherein when a first shelf assigns the first weight to the responsive signal from one or more RFID devices, and when a second shelf assigns the second weight to the responsive signal from one or more RFID devices, the second weight is disregarded.

4. The system of claim 3, wherein the RFID storage container transmits the first weight of the first shelf to a remote server.

5. A method for filtering cross reads, the method comprising:

transmitting a first radio frequency identification (RFID) emission signal to a first shelf of a RFID storage container and a second shelf of the RFID storage container;

emitting a first electromagnetic signal in response to receipt of the first RFID emission signal;

receiving from a RFID tag associated with a corresponding product stored on the first shelf or the second shelf, a responsive signal from a RFID device upon corresponding receipt of the first electromagnetic signal;

assigning a first weight to the responsive signal from the RFID device indicating a location within the RFID storage container of the corresponding product;

transmitting a second RFID emission signal to the first shelf of the RFID storage container and the second shelf of the RFID storage container;

emitting a second electromagnetic signal in response to receipt of the second RFID emission signal;

receiving from the RFID tag associated with the corresponding product stored on the first shelf or the second shelf, a responsive signal from the RFID device upon corresponding receipt of the second electromagnetic signal;

assigning a second weight to the responsive signal from the RFID device indicating a location within the RFID storage container of the corresponding product, wherein the first weight is a higher weight than the second weight; and promoting the second weight to the first weight when the method fails to assign a first weight, wherein the transmitting, emitting, receiving, and assigning are performed for a plurality of shelves within the RFID storage container, and wherein the promoting of the second weight is based on the first shelf or the second shelf which receives a greatest number of responsive signals.

6. The method of claim 5, wherein the first electromagnetic signal is at a lower power than the second electromagnetic signal.

7. The method of claim 5, wherein when the first shelf assigns the first weight to the responsive signal from one or more RFID devices, and when the second shelf assigns the second weight to the responsive signal from one or more RFID devices, the second weight is disregarded.

8. The method of claim 7, wherein transmitting the first weight of the first shelf to a remote server.

9. The system of claim 1, further comprising a second RFID storage container, and wherein the RFID storage container is further configured to:

transmit, via the control unit, a third RFID emission signal to the first shelf and the second shelf of the RFID storage container;

emit, via the array of antennas, a third electromagnetic signal in response to receipt of the third RFID emission signal;

receive, from the one or more RFID tags associated with one or more corresponding products, a third responsive signal from the one or more RFID devices upon corresponding receipt of the third electromagnetic signal; and assign a third weight to each responsive signal from the one or more RFID devices indicating a location within the RFID storage container or the second RFID storage container of the one or more corresponding products.

10. The system of claim 9, wherein the first electromagnetic signal is at a lower power than the second electromagnetic signal.

* * * * *